United States Patent
Salajegheh et al.

(10) Patent No.: US 9,710,752 B2
(45) Date of Patent: Jul. 18, 2017

(54) METHODS AND SYSTEMS FOR AGGREGATED MULTI-APPLICATION BEHAVIORAL ANALYSIS OF MOBILE DEVICE BEHAVIORS

(71) Applicant: QUALCOMM Incorporated, San Diego, CA (US)

(72) Inventors: Mastooreh Salajegheh, San Jose, CA (US); Yin Chen, Campbell, CA (US)

(73) Assignee: QUALCOMM Incorporated, San Diego, CA (US)

( * ) Notice: Subject to any disclaimer, the term of this patent is extended or adjusted under 35 U.S.C. 154(b) by 3 days.

(21) Appl. No.: 14/483,800

(22) Filed: Sep. 11, 2014

(65) Prior Publication Data
US 2016/0078347 A1 Mar. 17, 2016

(51) Int. Cl.
G06N 5/04 (2006.01)
G06N 99/00 (2010.01)
G06F 11/30 (2006.01)
G06F 11/34 (2006.01)
G06F 9/45 (2006.01)

(52) U.S. Cl.
CPC ........... *G06N 5/04* (2013.01); *G06F 11/3017* (2013.01); *G06F 11/3447* (2013.01); *G06F 11/3466* (2013.01); *G06N 99/005* (2013.01); *G06F 8/443* (2013.01); *G06F 2201/865* (2013.01)

(58) Field of Classification Search
CPC ............ G06F 11/3017; G06F 11/3447; G06F 11/3466; G06N 5/04; G06N 99/005
See application file for complete search history.

(56) References Cited

U.S. PATENT DOCUMENTS

2012/0124422 A1* 5/2012 Hsiao ................... G06F 11/3466
714/26
2013/0247187 A1* 9/2013 Hsiao .................... G06F 21/552
726/22

(Continued)

FOREIGN PATENT DOCUMENTS

EP          2323339 A2    5/2011
WO       2014126779 A1    8/2014

OTHER PUBLICATIONS

Marforio C., et al., "Analysis of the communication between colluding applications on modern smartphones," Proceedings of the 28th Annual Computer Security Applications Conference (ACSAC), Dec. 2012, 10 pages.

(Continued)

*Primary Examiner* — Viva Miller
(74) *Attorney, Agent, or Firm* — Won Tae C. Kim

(57) ABSTRACT

A computing device processor may be configured with processor-executable instructions to implement methods of using behavioral analysis and machine learning techniques to evaluate the collective behavior of two or more software applications operating on the device. The processor may be configured to monitor the activities of a plurality of software applications operating on the device, collect behavior information for each monitored activity, generate a behavior vector based on the collected behavior information, apply the generated behavior vector to a classifier model to generate analysis information, and use the analysis information to classify a collective behavior of the plurality of software applications.

26 Claims, 13 Drawing Sheets

(56) References Cited

U.S. PATENT DOCUMENTS

2014/0187177 A1\* 7/2014 Sridhara ............... G06N 5/043
455/73
2014/0237293 A1\* 8/2014 Cui ..................... G06F 11/3466
714/37

OTHER PUBLICATIONS

Shahzad F., et al., "A Survey on Recent Advances in Malicious Applications Analysis and Detection Techniques for Smartphones," ACM Computing Surveys, Technical Report (ISKMCD), Nov. 2012, pp. 1-45.
Bugiel S., et al., "Towards Taming Privilege-Escalation Attacks on Android," Feb. 7, 2012, 18 pages.
International Search Report and Written Opinion—PCT/US2015/047489—ISA/EPO—Nov. 23, 2015.
Marforio C., et al., "Application Collusion Attack on the Permission-Based Security Model and its Implications for Modern Smartphone Systems," Dec. 11, 2011, 16 pages.

\* cited by examiner

METHODS AND SYSTEMS FOR AGGREGATED MULTI-APPLICATION BEHAVIORAL ANALYSIS OF MOBILE DEVICE BEHAVIORS

BACKGROUND

Cellular and wireless communication technologies have seen explosive growth over the past several years. Wireless service providers now offer a wide array of features and services that provide their users with unprecedented levels of access to information, resources and communications. To keep pace with these enhancements, consumer electronic devices (e.g., cellular phones, watches, headphones, remote controls, etc.) have become more powerful and complex than ever, and now commonly include powerful processors, large memories, and other resources that allow for executing complex and powerful software applications on their devices. These devices also enable their users to download and execute a variety of software applications from application download services (e.g., Apple® App Store, Windows® Store, Google® play, etc.) or the Internet.

Due to these and other improvements, an increasing number of mobile and wireless device users now use their devices to store sensitive information (e.g., credit card information, contacts, etc.) and/or to accomplish tasks for which security is important. For example, mobile device users frequently use their devices to purchase goods, send and receive sensitive communications, pay bills, manage bank accounts, and conduct other sensitive transactions. Due to these trends, mobile devices are quickly becoming the next frontier for malware and cyber attacks. Accordingly, new and improved security solutions that better protect resource-constrained computing devices, such as mobile and wireless devices, will be beneficial to consumers.

SUMMARY

The various embodiments include methods of using behavioral analysis or machine learning techniques to evaluate the collective behavior of two or more software applications operating on a computing device. The methods may include analyzing a behavior in a computing device by monitoring, in a processor of the computing device, activities of a plurality of software applications, collecting behavior information for monitored activities of each of the plurality of software applications, generating a behavior vector based on the collected behavior information, applying the generated behavior vector to a classifier model to generate analysis information, and using the analysis information to evaluate a collective behavior of the plurality of software applications.

In an embodiment, generating the behavior vector based on the collected behavior information may include generating an information structure that characterizes the collective behavior of the plurality of software applications. In a further embodiment, generating the behavior vector based on the collected behavior information may include generating an information structure that characterizes a relationship between the plurality of software applications. In a further embodiment, monitoring the activities of the plurality of software applications may include monitoring interactions between the plurality of software applications, and using the analysis information to evaluate the collective behavior of the plurality of software applications may include identifying two or more software applications that should be evaluated together as a group.

In a further embodiment, the method may include monitoring additional activities of the identified two or more software applications to collect additional behavior information, generating a collective behavior vector that characterizes a collective behavior of the identified two or more software applications based on the collected additional behavior information, applying the generated collective behavior vector to the classifier model to generate additional analysis information, and using the additional analysis information to determine whether the collective behavior of the identified two or more software applications is non-benign. In a further embodiment, the method may include applying behavior vectors that each characterize a behavior of the identified two or more software applications to the classifier model to generate additional analysis information, aggregating the additional analysis information generated for each behavior vector, and using the analysis results to determine whether a collective behavior of the identified two or more software applications is non-benign.

In a further embodiment, applying the generated behavior vector to the classifier model to generate analysis information may include applying the generated behavior vector to a multi-application classifier model. In a further embodiment, generating the behavior vector based on the collected behavior information may include generating a plurality of behavior vectors that each characterize a behavior of one of the plurality of software applications, and applying the generated behavior vector to the multi-application classifier model may include applying each of the behavior vectors to the multi-application classifier model to generate the analysis information.

In a further embodiment, applying the generated behavior vector to the multi-application classifier model may include evaluating each test condition included in the multi-application classifier model, computing a weighted average of each result of evaluating test conditions in the multi-application classifier model, and determining whether the collective behavior is non-benign based on the weighted average. In a further embodiment, using the analysis information to classify the collective behavior of the plurality of software applications may include categorizing the monitored plurality of software applications, profiling each category of the plurality of software applications, and generating performance numbers for each category of the plurality of software applications.

Further embodiments may include a computing device having a processor configured with processor-executable instructions to perform operations that include monitoring activities of a plurality of software applications, collecting behavior information for monitored activities of each of the plurality of software applications, generating a behavior vector based on the collected behavior information, applying the generated behavior vector to a classifier model to generate analysis information, and using the analysis information to evaluate a collective behavior of the plurality of software applications.

In an embodiment, the processor may be configured with processor-executable instructions to perform operations such that generating the behavior vector based on the collected behavior information may include generating an information structure that characterizes the collective behavior of the plurality of software applications. In a further embodiment, the processor may be configured with processor-executable instructions to perform operations such that generating the behavior vector based on the collected behavior information may include generating an information structure that characterizes a relationship between the plurality of software applications. In a further embodiment, the processor may be configured with processor-executable instructions to perform operations such that monitoring the activities of the plurality of software applications may include monitoring interactions between the plurality of software applications, and such that using the analysis information to evaluate the collective behavior of the plurality of software applications may include identifying two or more software applications that should be evaluated together as a group.

In a further embodiment, the processor may be configured with processor-executable instructions to perform operations that further include monitoring additional activities of the identified two or more software applications to collect additional behavior information, generating a collective behavior vector that characterizes a collective behavior of the identified two or more software applications based on the collected additional behavior information, applying the generated collective behavior vector to the classifier model to generate additional analysis information, and using the additional analysis information to determine whether the collective behavior of the identified two or more software applications is non-benign.

In a further embodiment, the processor may be configured with processor-executable instructions to perform operations that further include applying behavior vectors that each characterize a behavior of the identified two or more software applications to the classifier model to generate additional analysis information, aggregating the additional analysis information generated for each behavior vector, and using the analysis results to determine whether a collective behavior of the identified two or more software applications is non-benign. In a further embodiment, the processor may be configured with processor-executable instructions to perform operations such that applying the generated behavior vector to the classifier model to generate analysis information may include applying the generated behavior vector to a multi-application classifier model.

In a further embodiment, the processor may be configured with processor-executable instructions to perform operations such that generating the behavior vector based on the collected behavior information may include generating a plurality of behavior vectors that each characterize a behavior of one of the plurality of software applications, and applying the generated behavior vector to the multi-application classifier model may include applying each of the behavior vectors to the multi-application classifier model to generate the analysis information.

In a further embodiment, the processor may be configured with processor-executable instructions to perform operations such that applying the generated behavior vector to the multi-application classifier model may include evaluating each test condition included in the multi-application classifier model, computing a weighted average of each result of evaluating test conditions in the multi-application classifier model, and determining whether the collective behavior is non-benign based on the weighted average.

In a further embodiment, the processor may be configured with processor-executable instructions to perform operations such that using the analysis information to classify the collective behavior of the plurality of software applications may include categorizing the monitored plurality of software applications, profiling each category of the plurality of software applications, and generating performance numbers for each category of the plurality of software applications.

In a further embodiment, the computing device may include a behavior observer hardware module configured to monitor use of computing device memory and hardware events at a hardware level and output collected behavior information to the processor. In such an embodiment, the processor may be configured with processor-executable instructions to perform operations such that monitoring activities of a plurality of software applications includes receiving the collected behavior information from the behavior observer hardware module.

Further embodiments may include a non-transitory computer readable storage medium having stored thereon processor-executable software instructions configured to cause a computing device processor to perform operations of the aspect methods described above. Further embodiments may include a computing device having means for performing functions of operations of the aspect methods described above.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
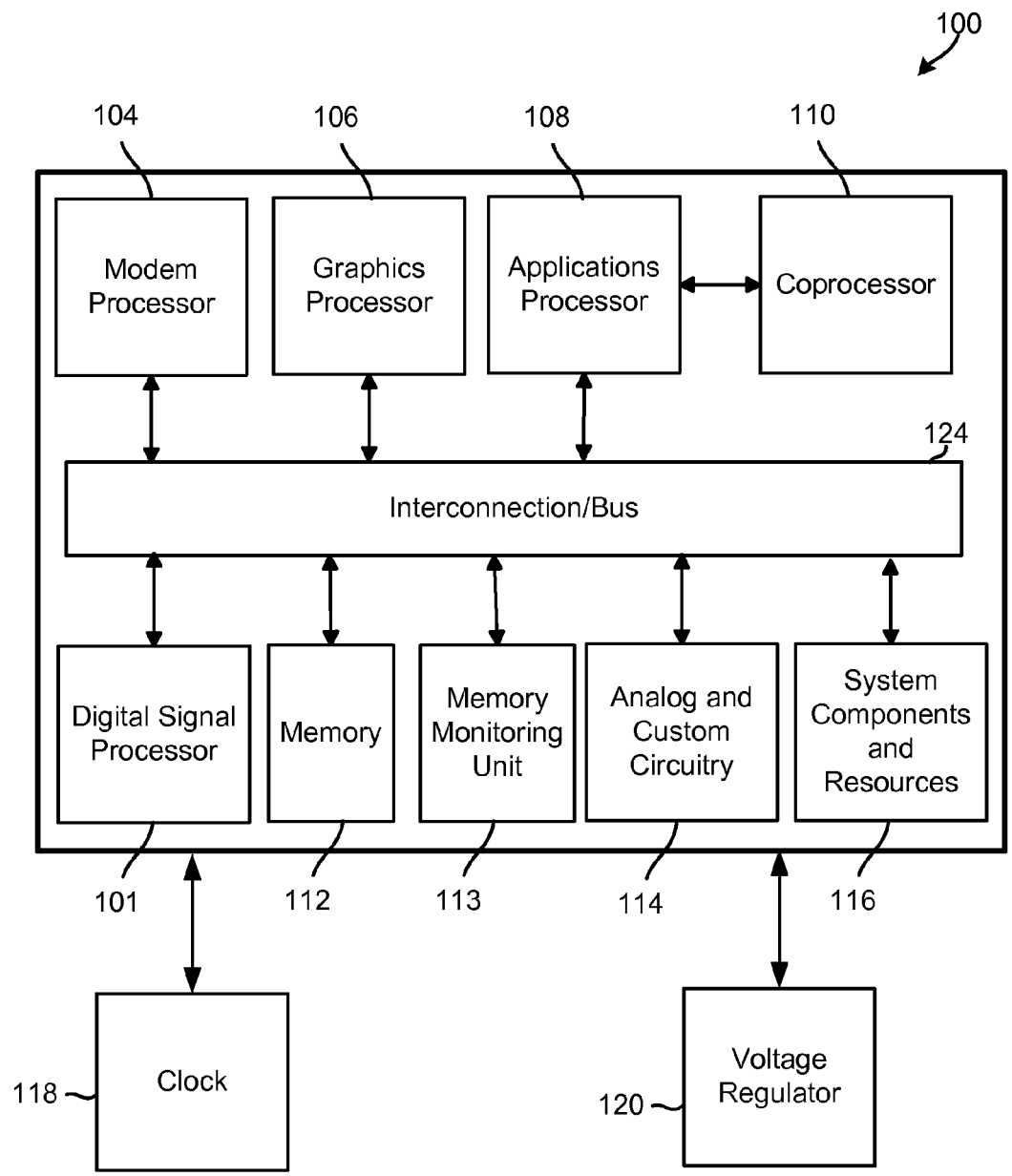
FIG. 1 is an architectural diagram of an example system on chip suitable for implementing the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various embodiments include methods, and computing devices configured to implement the methods, of using behavioral analysis and machine learning techniques to evaluate the collective behavior of two or more software applications operating on a computing device. For example, in an embodiment, a computing device may be configured to monitor the activities of software applications operating on the device, collect behavior information from the monitored activities, generate a behavior vector based on the collected behavior information, apply the behavior vector to a classifier model to generate analysis information, use the analysis information to identify a relationship between the software applications, identify the software applications that should be evaluated together as a group based on the identified relationship, aggregate the analysis results of the identified software applications, and use the aggregated analysis results to determine whether the collective behavior of the software applications is benign or non-benign. These operations improve the functioning of the computing device by allowing the device to quickly and efficiently identify and respond to various conditions or behaviors that may have a negative impact on the security, performance, or power consumption characteristics of the device, and which would not otherwise be detected by conventional behavior-based security solutions.

Computing devices may be equipped with a behavior-based security system that uses behavioral analysis techniques to identify, prevent, and/or correct the conditions, factors, and/or behaviors that often degrade a computing device's performance, power utilization levels, network usage levels, security and/or privacy over time. For example, the behavior-based security system may be configured to determine whether a software application is benign or non-benign (e.g., malicious, performance degrading, etc.), and perform various operations to correct, heal, cure, isolate, or otherwise fix the identified problems (e.g., behaviors determined to be non-benign).

While such a behavior-based security system is generally very effective for preventing the performance degradation of the computing device over time, malicious software applications may evade detection by such systems by colluding or working in concert to mask their operations. For example, when stealing information from a user's address book, a first malicious software application might access the address book, encode the information, and store the encoded information in a generic or discrete file. A second malicious application may then retrieve the encoded information stored in the generic/discrete file and send the information to a server.

Typically, the behavior-based security system would be able to determine that this sequence of operations (e.g., reading, storing, and transmitting address book data) is not consistent with normal operating patterns of the device, and classify this behavior as a non-benign behavior. However, since the operations are performed by multiple software applications working in concert, existing solutions often fail to identify these operations as being a part of the same sequence or behavior.

Individually, the operations of accessing address data, encoding data, storing the data in a file, and transmitting information stored in a file are not necessarily indicative of a non-benign behavior. Rather, it is the collective or sequential performance of these operations that is indicative of a non-benign behavior. Yet, existing behavior-based solutions do not adequately characterize the relationships between software applications. As a result, existing solutions often fail to accurately identify the operations that should be evaluated together as part of a single behavior. For these and other reasons, existing behavior-based security solutions are not adequate for identifying and responding to behaviors and conditions caused by the collective activities of a group of software applications, such as cyber attacks that include multiple software applications working in concert.

In view of these limitations of existing systems, the various embodiments equip computing devices with a behavior-based security system that is configured to intelligently and efficiently identify and respond to non-benign behaviors caused by the collective activities of a group of software applications, such as malicious software applications that are colluding or working in concert.

In an embodiment, the behavior-based security system may be configured to monitor the interactions between software applications, generate behavior vectors that characterize the relationships between the software applications, and apply the behavior vectors to classifier models to determine whether the applications are colluding or working in concert. The behavior-based security system may then identify the software applications that should be analyzed together as a group, apply the behavior vectors of the identified applications to a classifier model, aggregate the resulting information, and use the aggregated information to determine whether the collective behavior of the applications is non-benign. Alternatively, the behavior-based security system may identify the software applications that should be analyzed together as a group, generate a behavior vector that characterizes the collective behavior of the identified applications, and apply the generated behavior vector to the same or different classifier model to determine whether the collective behavior of the applications is non-benign.

The various embodiments improve the functioning of a computing device (e.g., a mobile computing device) for a number of reasons, some of which are explained in and/or are evident from the detailed descriptions of the embodiments below. For example, by intelligently identifying software applications that are colluding or working in concert, and by evaluating the operations of the identified applications together as part of a single device behavior, the various embodiments improve the functioning of the computing device by allowing the device to identify and respond to performance-degrading behaviors that would not otherwise be detected by conventional behavior-based security solutions. Further, by aggregating behavior information collected from multiple individual applications and monitoring the interactions between multiple applications, the various embodiments improve the functioning of the computing device by allowing the device to more accurately characterize the relationships between software applications, profile categories of software applications, better analyze the collective behavior of a group of software applications, and better classify system level device behaviors.

In addition, the various embodiments provide a behavior-based security system that allows a computing device to quickly and efficiently identify and respond to non-benign device behaviors without having a significant negative or user-perceivable impact on the responsiveness, performance, or power consumption characteristics of the computing device. As such, the behavior-based security system is well suited for inclusion and use in mobile devices and other resource constrained-computing devices, such as smartphones, which have limited resources, run on battery power, and for which performance and security are important.

Additional improvements to the functions, functionalities, and/or functioning of computing devices will be evident from the detailed descriptions of the embodiment provided below.

The term "performance degradation" is used in this application to refer to a wide variety of undesirable operations and characteristics of a computing device, such as longer processing times, slower real time responsiveness, lower battery life, loss of private data, malicious economic activity (e.g., sending unauthorized premium SMS message), denial of service (DoS), poorly written or designed software applications, malicious software, malware, viruses, fragmented memory, operations relating to commandeering the mobile device or utilizing the phone for spying or botnet activities, etc. Also, behaviors, activities, and conditions that degrade performance for any of these reasons are referred to herein as "not benign" or "non-benign."

The terms "mobile computing device" and "mobile device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor for which performance is important, and operate under battery power such that power conservation methods are of benefit. While the various embodiments are particularly useful for mobile computing devices, such as smartphones, which have limited resources and run on battery, the embodiments are generally useful in any electronic device that includes a processor and executes application programs.

Generally, the performance and power efficiency of a mobile device degrade over time. Recently, anti-virus companies (e.g., McAfee, Symantec, etc.) have begun marketing mobile anti-virus, firewall, and encryption products that aim to slow this degradation. However, many of these solutions rely on the periodic execution of a computationally-intensive scanning engine on the mobile device, which may consume many of the mobile device's processing and battery resources, slow or render the mobile device useless for extended periods of time, and/or otherwise degrade the user experience. In addition, these solutions are typically limited to detecting known viruses and malware, and do not address the multiple complex factors and/or the interactions that often combine to contribute to a mobile device's degradation over time (e.g., when the performance degradation is not caused by viruses or malware). For these and other reasons, existing anti-virus, firewall, and encryption products do not provide adequate solutions for identifying the numerous factors that may contribute to a mobile device's degradation over time, for preventing mobile device degradation, or for efficiently restoring an aging mobile device to its original condition.

Further, modern mobile devices are highly configurable and complex systems. As such, the features that are most important for determining whether a particular device behavior is benign or non-benign (e.g., malicious or performance-degrading) may be different in each mobile device. In addition, there are a large variety of factors that may contribute to the degradation in performance and power utilization levels of a mobile computing device over time, including poorly written or designed software applications, malware, viruses, fragmented memory, background processes, etc. Due to the number, variety, and complexity of these factors, it is often not feasible to evaluate all of the factors that may contribute to the degradation in performance and/or power utilization levels of the complex yet resource-constrained systems of modern mobile computing devices. As such, it is difficult for users, operating systems, and/or application programs (e.g., anti-virus software, etc.) to accurately and efficiently identify the sources of problems. As a result, mobile device users currently have few remedies for preventing the degradation in performance and power utilization levels of a mobile device over time, or for restoring an aging mobile device to its original performance and power utilization levels.

Currently, various solutions exist for modeling the behavior of a software application operating/executing on a computing device, and these solutions may be used along with machine learning techniques to determine whether a software application is malicious or benign. However, existing solutions are not suitable for use on mobile or resource-constrained devices because they require evaluating a very large corpus of behavior information, do not generate behavior models dynamically to account for device-specific and application-specific features of the computing device, do not intelligently prioritize the features in the behavior model, are limited to evaluating an individual application program or process, and/or require the execution of computationally-intensive processes in the device. As such, implementing or performing these solutions in a mobile or resource-constrained computing device may have a significant negative and/or user-perceivable impact on the responsiveness, performance, or power consumption characteristics of the device.

To provide better performance in view of these issues, computing devices (e.g., mobile devices, etc.) may be equipped with a behavior-based security system that is configured to use behavioral analysis techniques to intelligently and efficiently identify, prevent, correct, or otherwise respond to non-benign behaviors in the computing device without having a significant, negative, or user perceivable impact on the responsiveness, performance, or power consumption characteristics of the device.

The behavior-based security system may include an observer process, daemon, module, or sub-system (herein collectively referred to as a "module") a behavior extractor module, and an analyzer module. The observer module may be configured to instrument or coordinate various application programming interfaces (APIs), registers, counters, or other device components (herein collectively "instrumented components") at various levels of the computing device system (e.g., mobile device system), collect behavior information from the instrumented components, and communicate (e.g., via a memory write operation, function call, etc.) the collected behavior information to the behavior extractor module. The behavior extractor module may use the collected behavior information to generate behavior vectors that each represent or characterize many or all of the observed events, conditions, tasks, activities, and/or behaviors (herein collectively "behaviors") associated with one or more specific threads, processes, software applications, modules, or components of the device. The behavior extractor module may communicate (e.g., via a memory write operation, function call, etc.) the generated behavior vectors to the analyzer module, which use the behavior vectors to perform behavior analysis operations, which may include performing, executing, and/or applying data, algorithms, and/or models to determine whether a software application or device behavior is benign or non-benign (e.g., malicious, poorly written, performance-degrading, etc.). The computing device processor may then perform various operations to correct, heal, cure, isolate, or otherwise fix the identified problems (e.g., behaviors determined to be non-benign).

While the above-described system is generally very effective for preventing the degradation in performance and power utilization levels of a computing device over time, cyber attacks are growing in sophistication and may circumvent or evade detection by the behavior-based security system by using two or more software applications to mask their malicious operations. For example, two colluding software applications may coordinate their operations to steal a user's private information (e.g., contacts, credit card numbers, etc.) and avoid detection by the behavior-based security system. For example, a first colluding application may read and write the private information in a designated portion of the device's memory (or at a specific memory location), and a second colluding application may read and transmit the information stored in the memory location to a server. Since, individually, these are operations are not indicative of malicious activity, existing behavior-based security systems may not be able to accurately identify this sequence of operations as being associated with a single non-benign behavior.

One way to detect and determine that a sequence of operations is associated with a single behavior is by performing data flow tracking operations. Data flow tracking solutions, such as FlowDroid, are generally effective tools for preventing malicious software applications from evading detection. Briefly, data flow tracking solutions monitor many or all of the data operations (reads, writes, data encoding, data transmissions, etc.) in a computing system and attempt to identify the software applications that are, individually or collectively, using the data improperly. However, data flow tracking solutions require monitoring many of the data flows and data operations in the computing system and/or require the execution of very complex and power-intensive processes. As such, data flow tracking solutions are not suitable for use in mobile devices, which are typically resource constrained systems that have relatively limited processing, memory, and energy resources. In addition, modern mobile devices are complex systems, and it is often not feasible to evaluate all of the various data flows, data operations (reads, writes, data encoding, data transmissions, etc.), processes, components, behaviors, or factors (or combinations thereof) that may be malicious or otherwise contribute to the performance degradation of the mobile device. For all these reasons, existing data flow tracking solutions are not suitable for use in mobile and resource-constrained computing devices.

In view of these issues, the various embodiments may configure a device processor (e.g., a mobile device processor, etc.) to identify, analyze, prevent, and/or respond to collusion attacks and other conditions caused by the collective behavior of a select group of software applications without monitoring data flows or performing data flow tracking operations in the device. The device processor may accomplish this without having a significant negative or user-perceivable impact on the responsiveness, performance, or power consumption characteristics of the computing device. As such, the various embodiments are particularly useful in mobile and resource-constrained computing devices that include limited resources and for which performance and battery life are important.

In the various embodiments, the device processor (or a behavioral-based security system of the device) may be configured to monitor the interactions between two or more software applications, generate relationship information (e.g., behavior vectors, etc.) that identifies or characterizes the relationships between the monitored applications, use the relationship information to identify the software applications that should be evaluated together as a group, collect behavior information from each of the identified applications, aggregate the behavior information collected from each of the identified applications (e.g., in a behavior vector) and/or aggregate the results of evaluating each identified application (e.g., via a classifier model). The device processor may then use the aggregated information to evaluate the collective behavior of the identified applications as a single device behavior.

By determining the nature of the relationships and interactions between specific applications, the various embodiments allow the device processor to better determine whether two or more applications are working together to hide their malicious activities and/or whether the collective behaviors of a small or focused group of software applications have an unexpected negative impact on the performance characteristics of the computing device (e.g., due to one or more of the application being poorly designed, etc.).

In some embodiments, the device processor may be configured to categorize the monitored applications, profile or pre-profile select groups or categories of applications, and/or generate performance numbers for categories of applications. The performance numbers may include information suitable for use in identifying, evaluating, and/or comparing various performance characteristics, such as energy consumption, memory usage, bandwidth usage, CPU cycles, user experiences on application performance, user interface (UI) responsiveness, and other similar measurable characteristics of the individual applications, groups of applications, or categories of applications. By using behavioral analysis techniques to profile or generate performance numbers for the applications (or groups or categories of applications), the various embodiments allow the device processor to better identify and respond to applications or groups of applications that have an unexpected, disproportionate, or negative impact on the performance and/or power consumption levels of the computing device.

In the various embodiments, the computing device (e.g., mobile device, etc.) may be equipped with a comprehensive behavioral monitoring and analysis system configured to perform any or all of the operations discussed in this application. For example, the behavioral monitoring and analysis system may include an observer module, a behavior extractor module, and an analyzer module. The observer module may be configured to monitor the operations (e.g., memory read/write operations), interactions, relationships, and communications between select applications (or a group of application). This may be accomplished by monitoring various instrumented components, such as select portions of memory, select memory addresses, hardware components, a ContentResolver API, etc. By monitoring these instrumented components, the observer module may collect additional behavior information that would not otherwise be collected by conventional behavior-based security systems.

The behavior extractor module may be configured to use the behavior information (i.e., the information collected by the observer module) to generate behavior vectors that characterize the relationships between the applications and/or behavior vectors that represent or characterize the collective behavior of two or more applications. Each behavior vector may be an information structure that includes or encapsulates one or more "behavior features." A behavior feature may be an abstract number or symbol that represents all or a portion of an observed event, condition, activity, operation, relationship, interaction, or behavior in the computing device. Each behavior feature may be associated with a data type that identifies a range of possible values, operations that may be performed on those values, the meanings of the values, and other similar information. The data type may be used by the computing device to determine how the corresponding behavior feature (or feature value) should be measured, analyzed, weighted, or used.

The behavior extractor module may communicate (e.g., via a memory write operation, function call, etc.) the generated behavior vectors to the analyzer module, which may apply the behavior vectors to classifier models to determine the nature of the relationships between software applications (e.g., whether two or more software applications are working in concert, etc.) and/or to determine whether the collective behavior of the applications is non-benign.

A classifier model may be a behavior model that includes data, entries, decision nodes, decision criteria, and/or information structures that may be used by a device processor to quickly and efficiently test or evaluate specific features, factors, data points, entries, APIs, states, conditions, behaviors, software applications, processes, operations, components, etc. (herein collectively "features") or other embodiments of the device's behavior. A classifier model may also include information that may be used by a device processor to determine the nature of the relationships between software applications and/or the behaviors that to be monitored in the computing device.

Each classifier model may be categorized as a full classifier model or a lean classifier model. A full classifier model may be a robust data model that is generated as a function of a large training dataset, which may include thousands of features and billions of entries. A lean classifier model may be a more focused data model that is generated from a reduced dataset that includes or prioritizes tests on the features/entries that are most relevant for determining whether a particular computing device behavior is not benign. A local classifier model may be a lean classifier model that is generated in the mobile computing device. A device-specific classifier model may be a local classifier model that includes a focused data model that includes/tests only computing device-specific features/entries that are determined to be most relevant to classifying an activity or behavior in that specific device. An application-specific classifier model may be a local classifier model that includes a focused data model that includes or prioritizes tests on the features/entries that are most relevant for determining whether a particular software application (or a specific type of software application) is non-benign.

A multi-application classifier model may be a local classifier model that includes an aggregated feature set and/or decision nodes that test features relevant to evaluating two or more software applications. For example, a multi-application classifier model may include decision nodes that test conditions or features that are most relevant for identifying or characterizing the relationship between two software applications. As another example, a multi-application classifier model may include decision nodes that test conditions or features that are most relevant for determining whether the collective behavior of two software applications (or specific types of software applications) is non-benign.

In some embodiments, the device processor may be configured to generate a multi-application classifier model by combining two or more application-specific classifier models. In other embodiments, the device processor may generate a multi-application classifier model by identifying the device features that are most relevant for identifying the relationships, interactions, and/or communications between two or more software applications, identifying test conditions that evaluate the identified device features, and generating the classifier model to include the identified test conditions. In a further embodiment, the device processor may be configured to determine the priority, importance, or success rates of the identified test conditions, and to generate the classifier model so that the test conditions are ordered in accordance with their priority, importance, or success rates.

In various embodiments, the device processor may be configured to generate or use classifier models to determine the relationships between applications and/or to determine whether the collective behavior of the applications is non-benign.

For example, in an embodiment, the device processor may be configured to monitor the interactions between the software applications operating on the computing device, generate behavior vectors that characterize the relationships between the software applications, apply the behavior vectors to classifier models to generate analysis information, and use the analysis information to determine whether the applications are colluding or working in concert. The device processor may then identify the software applications should be analyzed together as a group (e.g., colluding applications), apply the behavior vectors of the identified applications to the same or different classifier model (or family of classifier models), aggregate the resulting analysis information, and use the aggregated analysis information to determine whether the collective behavior of the identified applications is non-benign.

As another example, the device processor may be configured to identify the software applications should be analyzed together as a group, monitor the activities of the identified applications, collect behavior information for each of the monitored activities, generate a behavior vector that characterizes the collective behavior of the identified applications based on the collected behavior information, apply the generated behavior vector to a classifier model (or family of classifier models) to generate analysis information, and use the analysis information to determine whether the collective behavior of the identified applications is non-benign.

In some embodiments, the device processor may also be configured to use the analysis information (i.e., results of applying a behavior vector to a classifier model) to categorize the monitored software applications, to profile each category of software applications, and/or to generating performance numbers for each category of software applications. For example, the device processor may use the analysis information to compute/estimate the amount of power consumed by a class of software applications (e.g., games, social networking, news, finance, etc.). Further, by pre-profiling and measuring the power consumption of each feature, the device processor may profile the power consumption of all activities or applications operating on the device. The device processor may use such information (e.g., estimates of power consumption) to predict battery life, identify the class or classes of applications that are consuming a significant amount the device's available resources, and perform other similar operations. The device processor may display such information to a user of the computing device or use this information to better evaluate device behaviors.

The various embodiments may be implemented in a number of different computing devices, including single processor and multiprocessor systems, and a system-on-chip (SOC). FIG. 1 is an architectural diagram illustrating an example system-on-chip (SOC) 100 architecture that may be used in computing devices implementing the various embodiments. The SOC 100 may include a number of heterogeneous processors, such as a digital signal processor (DSP) 101, a modem processor 104, a graphics processor 106, and an application processor 108. The SOC 100 may also include one or more coprocessors 110 (e.g., vector co-processor) connected to one or more of the heterogeneous processors 102, 104, 106, 108. Each processor 101, 104, 106, 108, 110 may include one or more cores, and each processor/core may perform operations independent of the other processors/cores. For example, the SOC 100 may include a processor that executes a first type of operating system (e.g., FreeBSD, LINIX, OS X, etc.) and a processor that executes a second type of operating system (e.g., Microsoft Windows 8).

The SOC 100 may also include analog circuitry and custom circuitry 114 for managing sensor data, analog-to-digital conversions, wireless data transmissions, and for performing other specialized operations, such as processing encoded audio signals for games and movies. The SOC 100 may further include system components and resources 116, such as voltage regulators, oscillators, phase-locked loops, peripheral bridges, data controllers, memory controllers, system controllers, access ports, timers, and other similar components used to support the processors and clients running on a computing device.

The system components/resources 116 and custom circuitry 114 may include circuitry to interface with peripheral devices, such as cameras, electronic displays, wireless communication devices, external memory chips, etc. The processors 101, 104, 106, 108 may be interconnected to one or more memory elements 112, system components, and resources 116 and custom circuitry 114 via an interconnection/bus module 124, which may include an array of reconfigurable logic gates and/or implement a bus architecture (e.g., CoreConnect, AMBA, etc.). Communications may be provided by advanced interconnects, such as high performance networks-on chip (NoCs).

An operating system executing in one or more of the processors 101, 104, 106, 108, 110 may be configured to control and coordinate the allocation and use of memory by the software applications, and partition the physical memory across the multiple software applications. As such, the operating system may include one or more memory management systems or processes (e.g., a virtual memory manager, etc.) that manage the allocation and use of memory by the various software applications, and ensure that the memory used by one process does not interfere with memory already in use by another process.

In addition to the software-based memory management systems or processes (e.g., OS VMM, etc.) discussed above, the SOC 100 may include one or more hardware-based memory management systems, such as a central processing unit (CPU) memory management unit (MMU) and a system MMU. The CPU MMU and the system MMU may be hardware components that are responsible for performing various memory related operations, such as the translation of virtual addresses to physical addresses, cache control, bus arbitration, and memory protection. For example, the CPU MMU may be responsible for providing address translation services and protection functionalities to the main CPU (e.g., the application processor 108), and the system MMU may be responsible for providing address translation services and protection functionalities to other hardware components (e.g., digital signal processor 101, modem processor 104, a graphics processor 106, etc.).

The SOC 100 may also include a hardware-based memory monitoring unit 113, which may be a programmable logic circuit (PLC) that is configured to monitor the access or use of the MMUs and memory elements 112 by software applications at the hardware level and/or based on hardware events (e.g., memory read and write operations, etc.). The hardware-based memory monitoring unit 113 may be separate from, and operate independent of, the other hardware and software-based memory management systems and MMUs of the device.

In various embodiments, the hardware-based memory monitoring unit 113 may be configured to monitor the access and use of the MMUs and memory elements 112 by the software applications to collect memory usage information, and compare the collected memory usage information to memory usage patterns (which may be programmed into the PLC) to identify relationships between applications and/or to determine whether the use of memory by the software applications is indicative of a suspicious or colluding behavior. The hardware-based memory monitoring unit 113 may then report the identified relationships and/or suspicious or colluding behaviors to the observer or analyzer modules (e.g., via the processors 101, 104, 106, 108).

The SOC 100 may further include an input/output module (not illustrated) for communicating with resources external to the SOC, such as a clock 118 and a voltage regulator 120. Resources external to the SOC (e.g., clock 118, voltage regulator 120) may be shared by two or more of the internal SOC processors/cores (e.g., DSP 101, modem processor 104, graphics processor 106, applications processor 108, etc.).

The SOC 100 may also include hardware and/or software components suitable for collecting sensor data from sensors, including speakers, user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well known components (e.g., accelerometer, etc.) of modern electronic devices.

In addition to the SOC 100 discussed above, the various embodiments may be implemented in a wide variety of computing systems, which may include a single processor, multiple processors, multicore processors, or any combination thereof.

Figure 2:
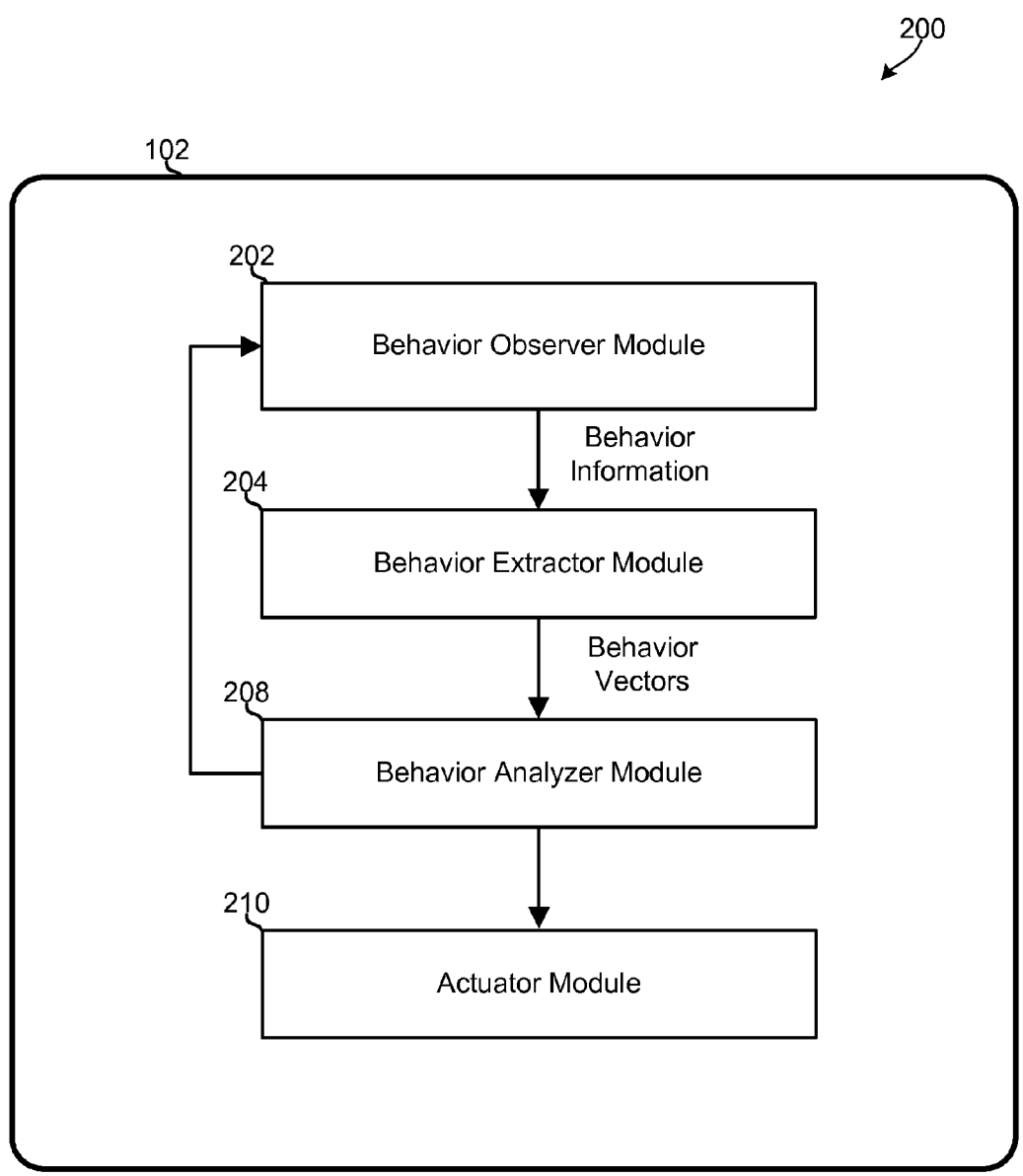
FIG. 2 is a block diagram illustrating example logical components and information flows in an embodiment mobile device configured to determine whether a particular mobile device behavior is benign or non-benign.

FIG. 2 illustrates example logical components and information flows in an embodiment mobile computing device 102 that includes a behavior-based security system 200 configured to use behavioral analysis techniques to identify and respond to non-benign device behaviors. In the example illustrated in FIG. 2, the computing device is a mobile computing device 102 that includes a device processor (i.e., mobile device processor) configured with executable instruction modules that include a behavior observer module 202, a behavior extractor module 204, a behavior analyzer module 208, and an actuator module 210. Each of the modules 202-210 may be a thread, process, daemon, module, sub-system, or component that is implemented in software, hardware, or a combination thereof. In various embodiments, the modules 202-210 may be implemented within parts of the operating system (e.g., within the kernel, in the kernel space, in the user space, etc.), within separate programs or applications, in specialized hardware buffers or processors, or any combination thereof. In an embodiment, one or more of the modules 202-210 may be implemented as software instructions executing on one or more processors of the mobile computing device 102.

The behavior observer module 202 may be configured to instrument application programming interfaces (APIs), counters, hardware monitors, etc. at various levels/modules of the device, and monitor the activities, conditions, operations, and events (e.g., system events, state changes, etc.) at the various levels/modules over a period of time. For example, the behavior observer module 202 may be configured to monitor various software and hardware components of the mobile computing device 102, and collect behavior information pertaining to the interactions, communications, transactions, events, or operations of the monitored and measurable components that are associated with the activities of the mobile computing device 102. Such activities include a software application's use of a hardware component, performance of an operation or task, a software application's execution in a processing core of the mobile computing device 102, the execution of process, the performance of a task or operation, a device behavior, etc.

As a further example, the behavior observer module 202 may be configured to monitor the activities of the mobile computing device 102 by monitoring the allocation or use of device memory by the software applications. In an embodiment, this may be accomplished by monitoring the operations of memory management system (e.g., a virtual memory manager, memory management unit, etc.) of the computing device. Such systems are generally responsible for managing the allocation and use of system memory by the various application programs to ensure that the memory used by one process does not interfere with memory already in use by another process. Therefore, by monitoring the operations of the memory management system, the device processor may collect behavior information that is suitable for use in determining whether to two applications are working in concert, such as whether two processes have been allocated the same memory space, are reading and writing information to the same memory address or location, or are performing other suspicious memory-related operations.

The behavior observer module 202 may collect behavior information pertaining to the monitored activities, conditions, operations, or events, and store the collected information in a memory (e.g., in a log file, etc.). The behavior observer module 202 may then communicate (e.g., via a memory write operation, function call, etc.) the collected behavior information to the behavior extractor module 204.

In an embodiment, the behavior observer module 202 may be configured to monitor the activities of the mobile computing device 102 by monitoring the allocation or use of device memory at the hardware level and/or based on hardware events (e.g., memory read and write operations, etc.). In a further embodiment, the behavior observer module 202 may be implemented in a hardware module (e.g., the memory monitoring unit 113 described above with reference to FIG. 1) for faster, near-real time execution of the monitoring functions. For example, the behavior observer module 202 may be implemented within a hardware module that includes a programmable logic circuit (PLC) in which the programmable logic elements are configured to monitor the allocation or use of computing device memory at the hardware level and/or based on hardware events (e.g., memory read and write operations, etc.) and otherwise implement the various embodiments. Such a hardware module may output results of hardware event monitoring to the device processor implementing the behavior extractor module 204. A PLC may be configured to monitor certain hardware and implement certain operations of the various embodiments described herein using PLC programming methods that are well known. Other circuits for implementing some operation of the embodiment methods in a hardware module may also be used.

Similarly, each of the modules 202-210 may be implemented in hardware modules, such as by including one or PLC elements in an SoC with the PLC element(s) configured using PLC programming methods to perform some operation of the embodiment methods.

The behavior extractor module 204 may be configured to receive or retrieve the collected behavior information, and use this information to generate one or more behavior vectors. In the various embodiments, the behavior extractor module 204 may be configured to generate the behavior vectors to include a concise definition of the observed behaviors, relationships, or interactions of the software applications. For example, each behavior vector may succinctly describe the collective behavior of the software applications in a value or vector data-structure. The vector data-structure may include series of numbers, each of which signifies a feature or a behavior of the device, such as whether a camera of the computing device is in use (e.g., as zero or one), how much network traffic has been transmitted from or generated by the computing device (e.g., 20 KB/sec, etc.), how many internet messages have been communicated (e.g., number of SMS messages, etc.), and/or any other behavior information collected by the behavior observer module 202. In an embodiment, the behavior extractor module 204 may be configured to generate the behavior vectors so that they function as an identifier that enables the computing device system (e.g., the behavior analyzer module 208) to quickly recognize, identify, or analyze the relationships between applications.

The behavior analyzer module 208 may be configured to apply the behavior vectors to classifier modules to identify the nature of the relationship between two or more software applications. The behavior analyzer module 208 may also be configured to apply the behavior vectors to classifier modules to determine whether a collective device behavior (i.e., the collective activities of two or more software applications operating on the device) is a non-benign behavior that is contributing to (or is likely to contribute to) the device's degradation over time and/or which may otherwise cause problems on the device.

The behavior analyzer module 208 may notify the actuator module 210 that an activity or behavior is not benign. In response, the actuator module 210 may perform various actions or operations to heal, cure, isolate, or otherwise fix identified problems. For example, the actuator module 210 may be configured to stop or terminate one or more of the software applications when the result of applying the behavior vector to the classifier model (e.g., by the analyzer module) indicates that the collective behavior of the software applications not benign.

In various embodiments, the behavior observer module 202 may be configured to monitor the activities of the mobile computing device 102 by collecting information pertaining to library API calls in an application framework or run-time libraries, system call APIs, file-system and networking sub-system operations, device (including sensor devices) state changes, and other similar events. In addition, the behavior observer module 202 may monitor file system activity, which may include searching for filenames, categories of file accesses (personal info or normal data files), creating or deleting files (e.g., type exe, zip, etc.), file read/write/seek operations, changing file permissions, etc.

The behavior observer module 202 may also monitor the activities of the mobile computing device 102 by monitoring data network activity, which may include types of connections, protocols, port numbers, server/client that the device is connected to, the number of connections, volume or frequency of communications, etc. The behavior observer module 202 may monitor phone network activity, which may include monitoring the type and number of calls or messages (e.g., SMS, etc.) sent out, received, or intercepted (e.g., the number of premium calls placed).

The behavior observer module 202 may also monitor the activities of the mobile computing device 102 by monitoring the system resource usage, which may include monitoring the number of forks, memory access operations, number of files open, etc. The behavior observer module 202 may monitor the state of the mobile computing device 102, which may include monitoring various factors, such as whether the display is on or off, whether the device is locked or unlocked, the amount of battery remaining, the state of the camera, etc. The behavior observer module 202 may also monitor inter-process communications (IPC) by, for example, monitoring intents to crucial services (browser, contracts provider, etc.), the degree of inter-process communications, pop-up windows, etc.

The behavior observer module 202 may also monitor the activities of the mobile computing device 102 by monitoring driver statistics and/or the status of one or more hardware components, which may include cameras, sensors, electronic displays, WiFi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile computing device 102.

The behavior observer module 202 may also monitor the activities of the mobile computing device 102 by monitoring one or more hardware counters that denote the state or status of the mobile computing device 102 and/or computing device sub-systems. A hardware counter may include a special-purpose register of the processors/cores that is configured to store a count value or state of hardware-related activities or events occurring in the mobile computing device 102.

The behavior observer module 202 may also monitor the activities of the mobile computing device 102 by monitoring the actions or operations of software applications, software downloads from an application download server (e.g., Apple® App Store server), computing device information used by software applications, call information, text messaging information (e.g., SendSMS, BlockSMS, ReadSMS, etc.), media messaging information (e.g., ReceiveMMS), user account information, location information, camera information, accelerometer information, browser information, content of browser-based communications, content of voice-based communications, short range radio communications (e.g., Bluetooth, WiFi, etc.), content of text-based communications, content of recorded audio files, phonebook or contact information, contacts lists, etc.

The behavior observer module 202 may also monitor the activities of the mobile computing device 102 by monitoring transmissions or communications of the mobile computing device 102, including communications that include voice-mail (VoiceMailComm), device identifiers (DeviceID-Comm), user account information (UserAccountComm), calendar information (CalendarComm), location information (LocationComm), recorded audio information (RecordAudioComm), accelerometer information (AccelerometerComm), etc.

The behavior observer module 202 may also monitor the activities of the mobile computing device 102 by monitoring the usage of, and updates/changes to, compass information, computing device settings, battery life, gyroscope information, pressure sensors, magnet sensors, screen activity, etc. The behavior observer module 202 may monitor notifications communicated to and from a software application (AppNotifications), application updates, etc. The behavior observer module 202 may monitor conditions or events pertaining to a first software application requesting the downloading and/or install of a second software application. The behavior observer module 202 may monitor conditions or events pertaining to user verification, such as the entry of a password, etc.

The behavior observer module 202 may also monitor the activities of the mobile computing device 102 by monitoring conditions or events at multiple levels of the mobile computing device 102, including the application level, radio level, and sensor level. Application level observations may include observing the user via facial recognition software, observing social streams, observing notes entered by the user, observing events pertaining to the use of PassBook®, Google® Wallet, Paypal®, and other similar applications or services. Application level observations may also include observing events relating to the use of virtual private networks (VPNs) and events pertaining to synchronization, voice searches, voice control (e.g., lock/unlock a phone by saying one word), language translators, the offloading of data for computations, video streaming, camera usage without user activity, microphone usage without user activity, etc.

Radio level observations may include determining the presence, existence or amount of any or more of user interaction with the mobile computing device 102 before establishing radio communication links or transmitting information, dual/multiple subscriber identification module (SIM) cards, Internet radio, mobile phone tethering, offloading data for computations, device state communications, the use as a game controller or home controller, vehicle communications, computing device synchronization, etc. Radio level observations may also include monitoring the use of radios (WiFi, WiMax, Bluetooth, etc.) for positioning, peer-to-peer (p2p) communications, synchronization, vehicle to vehicle communications, and/or machine-to-machine (m2m). Radio level observations may further include monitoring network traffic usage, statistics, or profiles.

Sensor level observations may include monitoring a magnet sensor or other sensor to determine the usage and/or external environment of the mobile computing device 102. For example, the computing device processor may be configured to determine whether the device is in a holster (e.g., via a magnet sensor configured to sense a magnet within the holster) or in the user's pocket (e.g., via the amount of light detected by a camera or light sensor). Detecting that the mobile computing device 102 is in a holster may be relevant to recognizing suspicious behaviors, for example, because activities and functions related to active usage by a user (e.g., taking photographs or videos, sending messages, conducting a voice call, recording sounds, etc.) occurring while the mobile computing device 102 is holstered could be signs of nefarious processes executing on the device (e.g., to track or spy on the user).

Other examples of sensor level observations related to usage or external environments may include, detecting NFC signaling, collecting information from a credit card scanner, barcode scanner, or mobile tag reader, detecting the presence of a Universal Serial Bus (USB) power charging source, detecting that a keyboard or auxiliary device has been coupled to the mobile computing device 102, detecting that the mobile computing device 102 has been coupled to another computing device (e.g., via USB, etc.), determining whether an LED, flash, flashlight, or light source has been modified or disabled (e.g., maliciously disabling an emergency signaling app, etc.), detecting that a speaker or microphone has been turned on or powered, detecting a charging or power event, detecting that the mobile computing device 102 is being used as a game controller, etc. Sensor level observations may also include collecting information from medical or healthcare sensors or from scanning the user's body, collecting information from an external sensor plugged into the USB/audio jack, collecting information from a tactile or haptic sensor (e.g., via a vibrator interface, etc.), collecting information pertaining to the thermal state of the mobile computing device 102, etc.

To reduce the number of factors monitored to a manageable level, in an embodiment, the behavior observer module 202 may be configured to perform coarse observations by monitoring/observing an initial set of behaviors or factors that are a small subset of all factors that could contribute to the computing device's degradation. In an embodiment, the behavior observer module 202 may receive the initial set of behaviors and/or factors from a server and/or a component in a cloud service or network. In an embodiment, the initial set of behaviors/factors may be specified in machine learning classifier models.

Each classifier model may be a behavior model that includes data and/or information structures (e.g., feature vectors, behavior vectors, component lists, etc.) that may be used by a computing device processor to evaluate a specific feature or embodiment of a computing device's behavior. Each classifier model may also include decision criteria for monitoring a number of features, factors, data points, entries, APIs, states, conditions, behaviors, applications, processes, operations, components, etc. (herein collectively "features") in the computing device. The classifier models may be preinstalled on the computing device, downloaded or received from a network server, generated in the computing device, or any combination thereof. The classifier models may be generated by using crowd sourcing solutions, behavior modeling techniques, machine learning algorithms, etc.

Each classifier model may be categorized as a full classifier model or a lean classifier model. A full classifier model may be a robust data model that is generated as a function of a large training dataset, which may include thousands of features and billions of entries. A lean classifier model may be a more focused data model that is generated from a reduced dataset that includes/tests only the features/entries that are most relevant for determining whether a particular activity is an ongoing critical activity and/or whether a particular computing device behavior is not benign. As an example, a device processor may be may be configured to receive a full classifier model from a network server, generate a lean classifier model in the computing device based on the full classifier, and use the locally generated lean classifier model to classify a behavior of the device as being either benign or non-benign (i.e., malicious, performance degrading, etc.).

A locally generated lean classifier model is a lean classifier model that is generated in the computing device. That is, since modern computing devices (e.g., mobile devices, etc.) are highly configurable and complex systems, the features that are most important for determining whether a particular device behavior is non-benign (e.g., malicious or performance-degrading) may be different in each device. Further, a different combination of features may require monitoring and/or analysis in each device in order for that device to quickly and efficiently determine whether a particular behavior is non-benign. Yet, the precise combination of features that require monitoring and analysis, and the relative priority or importance of each feature or feature combination, can often only be determined using information obtained from the specific device in which the behavior is to be monitored or analyzed. For these and other reasons, various embodiments may generate classifier models in the computing device in which the models are used. These local classifier models allow the device processor to accurately identify the specific features that are most important in determining whether a behavior on that specific device is non-benign (e.g., contributing to that device's degradation in performance). The local classifier models also allow the device processor to prioritize the features that are tested or evaluated in accordance with their relative importance to classifying a behavior in that specific device.

A device-specific classifier model is a classifier model that includes a focused data model that includes/tests only computing device-specific features/entries that are determined to be most relevant to classifying an activity or behavior in a specific computing device. An application-specific classifier model is a classifier model that includes a focused data model that includes/tests only the features/entries that are most relevant for evaluating a particular software application. By dynamically generating application-specific classifier models locally in the computing device, the various embodiments allow the device processor to focus its monitoring and analysis operations on a small number of features that are most important for determining whether the operations of a specific software application are contributing to an undesirable or performance degrading behavior of that device.

A multi-application classifier model may be a local classifier model that includes a focused data model that includes or prioritizes tests on the features/entries that are most relevant for determining whether the collective behavior of two or more specific software applications (or specific types of software applications) is non-benign. A multi-application classifier model may include an aggregated feature set and/or decision nodes that test/evaluate an aggregated set of features. The device processor may be configured to generate a multi-application classifier model by identifying the device features that are most relevant for identifying the relationships, interactions, and/or communications between two or more software applications operating on the computing device, identifying the test conditions that evaluate one of identified device features, determining the priority, importance, or success rates of the identified test conditions, prioritizing or ordering the identified test conditions in accordance with their importance or success rates, and generating the classifier model to include the identified test conditions so that they are ordered in accordance with their determined priorities, importance, or success rates. The device processor may also be configured to generate a multi-application classifier model by combining two or more application-specific classifier models.

In various embodiments, the device processor may be configured to generate a multi-application classifier model in response to determine that two or more applications are colluding or working in concert or that applications should be analyzed together as a group. The device processor may be configured to generate a multi-application classifier model for each identified group or class of applications. However, analyzing every group may consume a significant amount of the device's limited resources. Therefore, in an embodiment, the device processor may be configured to determine the probability that an application is engaged in a collusive behavior (e.g., based on its interactions with the other applications, etc.), and intelligently generate the classifier models for only the groups that include software applications for which there is a high probability of collusive behavior.

The behavior analyzer module 208 may be configured to apply the behavior vectors generated by the behavior extractor module 204 to a classifier model to determine whether a monitored activity (or behavior) is benign or non-benign. In an embodiment, the behavior analyzer module 208 may classify a behavior as "suspicious" when the results of its behavioral analysis operations do not provide sufficient information to classify the behavior as either benign or non-benign.

The behavior analyzer module 208 may be configured to notify the behavior observer module 202 in response to identifying the colluding software applications, determining that certain applications should be evaluated as a group, and/or in response to determining that a monitored activity or behavior is suspicious. In response, the behavior observer module 202 may adjust the granularity of its observations (i.e., the level of detail at which computing device features are monitored) and/or change the applications/factors/behaviors that are monitored based on information received from the behavior analyzer module 208 (e.g., results of the real-time analysis operations), generate or collect new or additional behavior information, and send the new/additional information to the behavior analyzer module 208 for further analysis/classification.

Such feedback communications between the behavior observer module 202 and the behavior analyzer module 208 enable the mobile computing device 102 to recursively increase the granularity of the observations (i.e., make finer or more detailed observations) or change the features/behaviors that are observed until a collective behavior is classified as benign or non-benign, a source of a suspicious or performance-degrading behavior is identified, until a processing or battery consumption threshold is reached, or until the device processor determines that the source of the suspicious or performance-degrading device behavior cannot be identified from further changes, adjustments, or increases in observation granularity. Such feedback communication also enable the mobile computing device 102 to adjust or modify the behavior vectors and classifier models without consuming an excessive amount of the computing device's processing, memory, or energy resources.

The behavior observer module 202 and the behavior analyzer module 208 may provide, either individually or collectively, real-time behavior analysis of the computing system's behaviors to identify suspicious behavior from limited and coarse observations, to dynamically determine behaviors to observe in greater detail, and to dynamically determine the level of detail required for the observations. This allows the mobile computing device 102 to efficiently identify and prevent problems without requiring a large amount of processor, memory, or battery resources on the device.

In various embodiments, the device processor of the mobile computing device 102 may be configured to identify a critical data resource that requires close monitoring, monitor (e.g., via the behavior observer module 202) API calls made by software applications when accessing the critical data resource, identify a pattern of API calls as being indicative of non-benign behavior by two or more software applications, generate a behavior vector based on the identified pattern of API calls and resource usage, use the behavior vector to perform behavior analysis operations (e.g., via the behavior analyzer module 208), and determine whether one or more of the software application is non-benign based on the behavior analysis operations.

In an embodiment, the device processor may be configured to identify APIs that are used most frequently by software applications operating on the computing device, store information regarding usage of identified hot APIs in an API log in a memory of the device, and perform behavior analysis operations based on the information stored in the API log to identify a non-benign behavior.

In the various embodiments, the mobile computing device 102 may be configured to work in conjunction with a network server to intelligently and efficiently identify the features, factors, and data points that are most relevant to determining whether an activity or behavior is non-benign. For example, the device processor may be configured to receive a full classifier model from the network server, and use the received full classifier model to generate lean classifier models (i.e., data/behavior models) that are specific for the features and functionalities of the computing device or the software applications operating on the device. The device processor may use the full classifier model to generate a family of lean classifier models of varying levels of complexity (or "leanness"). The leanest family of lean classifier models (i.e., the lean classifier model based on the fewest number of test conditions) may be applied routinely until a behavior is encountered that the model cannot categorize as either benign or not benign (and therefore is categorized by the model as suspicious), at which time a more robust (i.e., less lean) lean classifier model may be applied in an attempt to categorize the behavior. The application of ever more robust lean classifier models within the family of generated lean classifier models may be applied until a definitive classification of the behavior is achieved. In this manner, the device processor can strike a balance between efficiency and accuracy by limiting the use of the most complete, but resource-intensive lean classifier models to those situations where a robust classifier model is needed to definitively classify a behavior.

In various embodiments, the device processor may be configured to generate lean classifier models by converting a finite state machine representation/expression included in a full classifier model into boosted decision stumps. The device processor may prune or cull the full set of boosted decision stumps based on device-specific features, conditions, or configurations to generate a classifier model that includes a subset of boosted decision stumps included in the full classifier model. The device processor may then use the lean classifier model to intelligently monitor, analyze and/or classify a computing device behavior.

Boosted decision stumps are one level decision trees that have exactly one node (and thus one test question or test condition) and a weight value, and thus are well suited for use in a binary classification of data/behaviors. That is, applying a behavior vector to boosted decision stump results in a binary answer (e.g., Yes or No). For example, if the question/condition tested by a boosted decision stump is "is the frequency of Short Message Service (SMS) transmissions less than x per minute," applying a value of "3" to the boosted decision stump will result in either a "yes" answer (for "less than 3" SMS transmissions) or a "no" answer (for "3 or more" SMS transmissions).

Boosted decision stumps are efficient because they are very simple and primal (and thus do not require significant processing resources). Boosted decision stumps are also very parallelizable, and thus many stumps may be applied or tested in parallel/at the same time (e.g., by multiple cores or processors in the computing device).

In an embodiment, the device processor may be configured to generate a lean classifier model that includes a subset of classifier criteria included in the full classifier model and only those classifier criteria corresponding to the features relevant to the computing device configuration, functionality, and connected/included hardware. The device processor may use this lean classifier model(s) to monitor only those features and functions present or relevant to the device. The device processor may then periodically modify or regenerate the lean classifier model(s) to include or remove various features and corresponding classifier criteria based on the computing device's current state and configuration.

As an example, the device processor may be configured to receive a large boosted-decision-stumps classifier model that includes decision stumps associated with a full feature set of behavior models (e.g., classifiers), and derive one or more lean classifier models from the large classifier models by selecting only features from the large classifier model(s) that are relevant the computing device's current configuration, functionality, operating state and/or connected/included hardware, and including in the lean classifier model a subset of boosted decision stumps that correspond to the selected features. In this embodiment, the classifier criteria corresponding to features relevant to the computing device may be those boosted decision stumps included in the large classifier model that test at least one of the selected features. The device processor may then periodically modify or regenerate the boosted decision stumps lean classifier model(s) to include or remove various features based on the computing device's current state and configuration so that the lean classifier model continues to include application-specific or device-specific feature boosted decision stumps.

In addition, the device processor may also dynamically generate application-specific classifier models that identify conditions or features that are relevant to specific software applications (Google® wallet and eTrade®) and/or to a specific type of software application (e.g., games, navigation, financial, news, productivity, etc.). These classifier models may be generated to include a reduced and more focused subset of the decision nodes that are included in the full classifier model (or of those included in a leaner classifier model generated from the received full classifier model). These classifier models may be combined to generate multi-application classifier models.

In various embodiments, the device processor may be configured to generate application-based classifier models for each software application in the system and/or for each type of software application in the system. The device processor may also be configured to dynamically identify the software applications and/or application types that are a high risk or susceptible to abuse (e.g., financial applications, point-of-sale applications, biometric sensor applications, etc.), and generate application-based classifier models for only the software applications and/or application types that are identified as being high risk or susceptible to abuse. In various embodiments, device processor may be configured to generate the application-based classifier models dynamically, reactively, proactively, and/or every time a new application is installed or updated.

Each software application generally performs a number of tasks or activities on the computing device. The specific execution state in which certain tasks/activities are performed in the computing device may be a strong indicator of whether a behavior or activity merits additional or closer scrutiny, monitoring and/or analysis. As such, in the various embodiments, the device processor may be configured to use information identifying the actual execution states in which certain tasks/activities are performed to focus its behavioral monitoring and analysis operations, and better determine whether an activity is a critical activity and/or whether the activity is non-benign.

In various embodiments, the device processor may be configured to associate the activities/tasks performed by a software application with the execution states in which those activities/tasks were performed. For example, the device processor may be configured to generate a behavior vector that includes the behavior information collected from monitoring the instrumented components in a sub-vector or data-structure that lists the features, activities, or operations of the software for which the execution state is relevant (e.g., location access, SMS read operations, sensor access, etc.). In an embodiment, this sub-vector/data-structure may be stored in association with a shadow feature value sub-vector/data-structure that identifies the execution state in which each feature/activity/operation was observed. As an example, the device processor may generate a behavior vector that includes a "location background" data field whose value identifies the number or rate that the software application accessed location information when it was operating in a background state. This allows the device processor to analyze this execution state information independent of and/or in parallel with the other observed/monitored activities of the computing device. Generating the behavior vector in this manner also allows the system to aggregate information (e.g., frequency or rate) over time.

In various embodiments, the device processor may be configured to generate the behavior vectors to include information that may be input to a decision node in the machine learning classifier to generate an answer to a query regarding the monitored activity.

In various embodiments, the device processor may be configured to generate the behavior vectors to include execution information. The execution information may be included in the behavior vector as part of a behavior (e.g., camera used 5 times in 3 second by a background process, camera used 3 times in 3 second by a foreground process, etc.) or as part of an independent feature. In an embodiment, the execution state information may be included in the behavior vector as a shadow feature value sub-vector or data structure. In an embodiment, the behavior vector may store the shadow feature value sub-vector/data structure in association with the features, activities, tasks for which the execution state is relevant.

Figure 3:
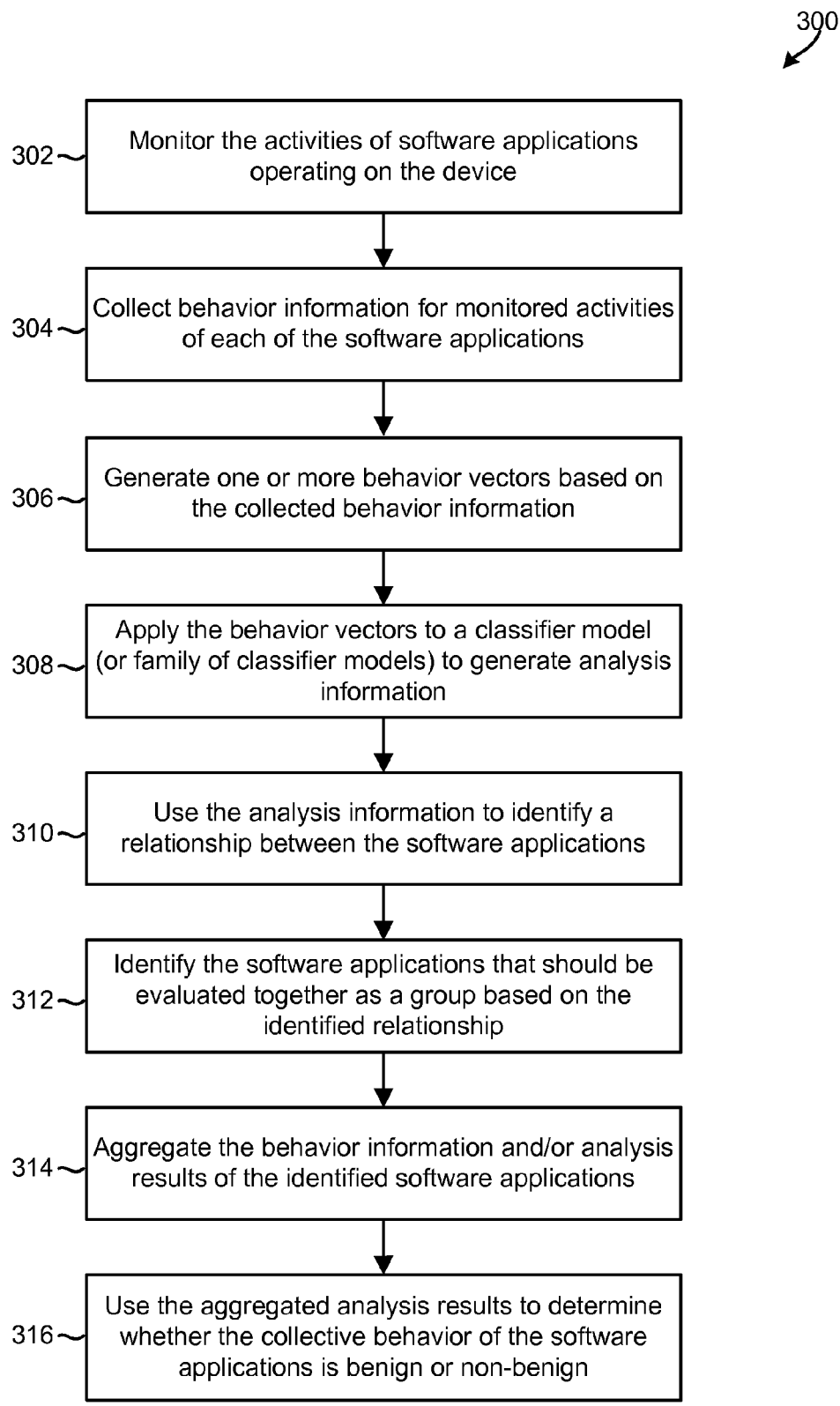
FIG. 3 is a process flow diagram illustrating a method of evaluating the collective behavior of two or more software applications in accordance with an embodiment.

FIG. 3 illustrates a method 300 of using behavioral analysis techniques to evaluate the collective behavior of two or more software applications in accordance with an embodiment. Method 300 may be performed in a processing core of a mobile or resource constrained computing device.

In block 302, the processing core may monitor the activities of software applications operating on the device. In block 304, the processing core may collect behavior information from the monitored activities. In block 306, the processing core may generate a behavior vector based on the collected behavior information. In block 308, the processing core may apply the behavior vector to a classifier model (or family of classifier models) to generate analysis information. In block 310, the processing core may use the analysis information to identify a relationship between the software applications. In block 312, the processing core may identify the software applications that should be evaluated together as a group based on the identified relationship. In block 314, the processing core may aggregate the behavior information and/or analysis results of the identified software applications. In block 316, the processing core may use the aggregated analysis results to determine whether the collective behavior of the software applications is benign or non-benign.

Figure 4:
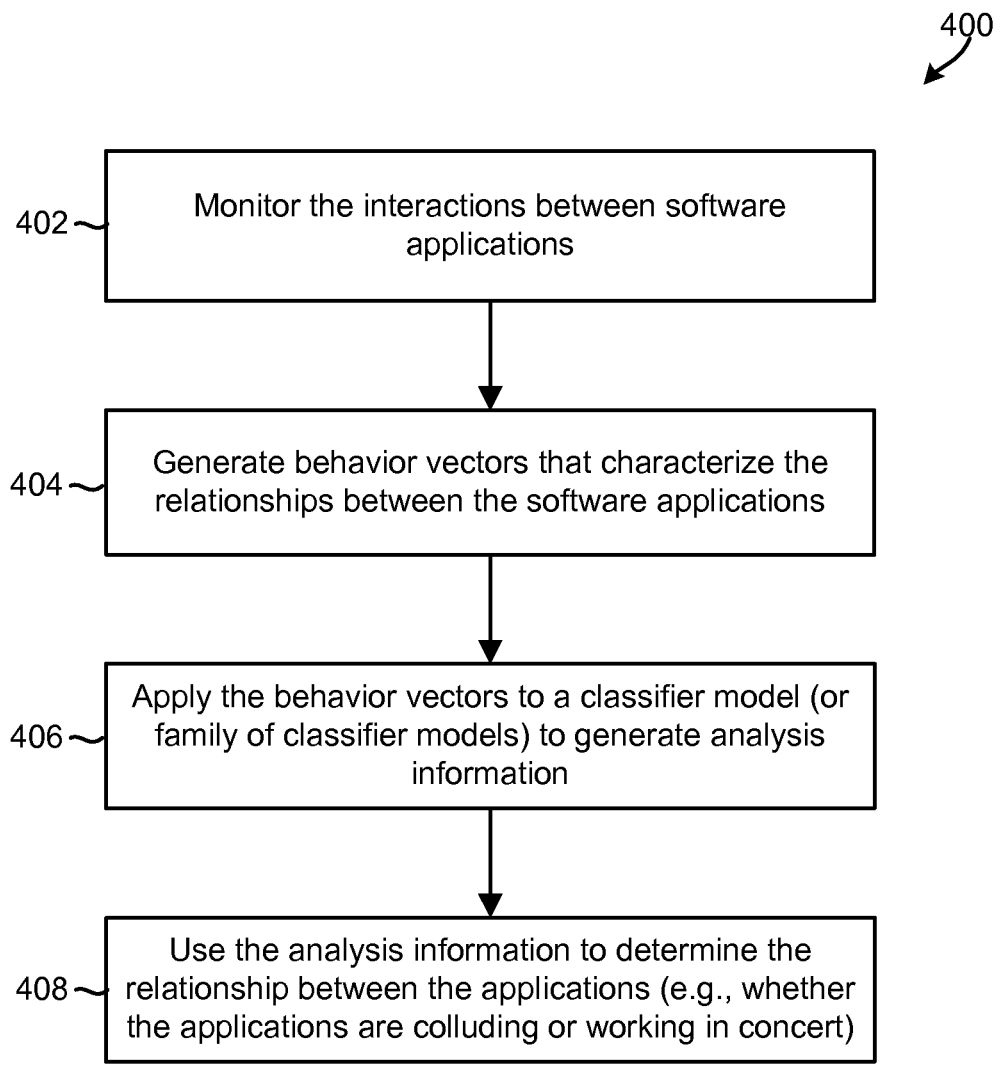
FIG. 4 is a process flow diagram illustrating a method of determining the relationship between two or more software applications in accordance with an embodiment.

FIG. 4 illustrates a method 400 of using behavioral analysis techniques to determine the relationship between software applications in accordance with an embodiment. Method 400 may be performed in a processing core of a mobile or resource constrained computing device. In block 402, the processing core may monitor the interactions between the software applications operating on the computing device. In block 404, the processing core may generate behavior vectors that characterize the relationships between the software applications. In block 406, the processing core may apply the behavior vectors to a classifier model (or family of classifier models) to generate analysis information. In block 408, the processing core may use the analysis information to determine the nature of the relationship between the applications, such as whether the applications are colluding or working in concert.

Figure 5:
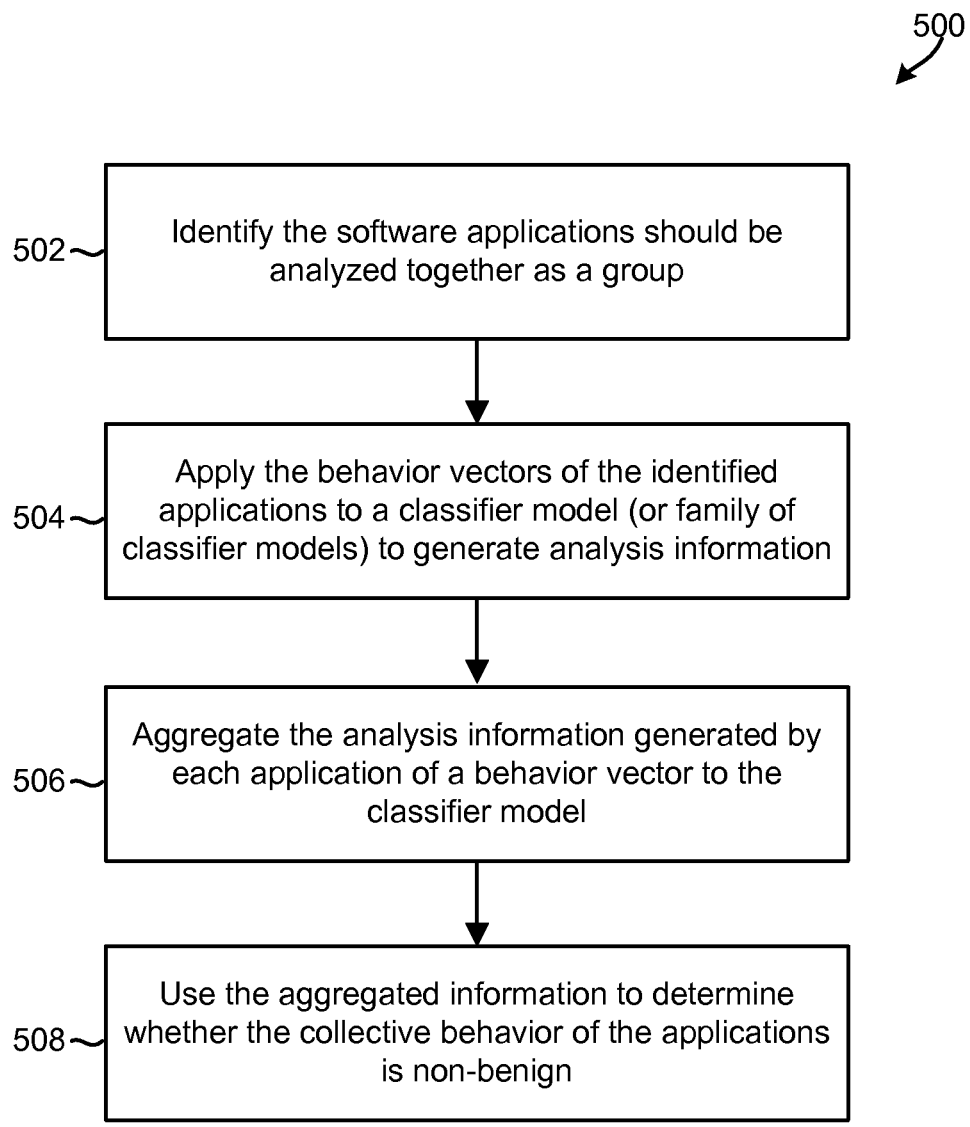
FIG. 5 is a process flow diagram illustrating a method of determining whether the collective behavior of two or more software applications is non-benign in accordance with an embodiment.

FIG. 5 illustrates a method 500 of using behavioral analysis techniques to determine whether the collective behavior of the identified applications is non-benign in accordance with an embodiment. Method 500 may be performed in a processing core of a mobile or resource constrained computing device. In block 502, the processing core may identify the software applications that should be analyzed together as a group (e.g., colluding applications, etc.). In block 504, the processing core may apply the behavior vectors of the identified applications to a classifier model (or family of classifier models). In block 506, the processing core may aggregate the analysis information generated by each application of a behavior vector to the classifier model. In block 508, the processing core may use the aggregated analysis information to determine whether the collective behavior of the identified applications is non-benign.

Figure 6:
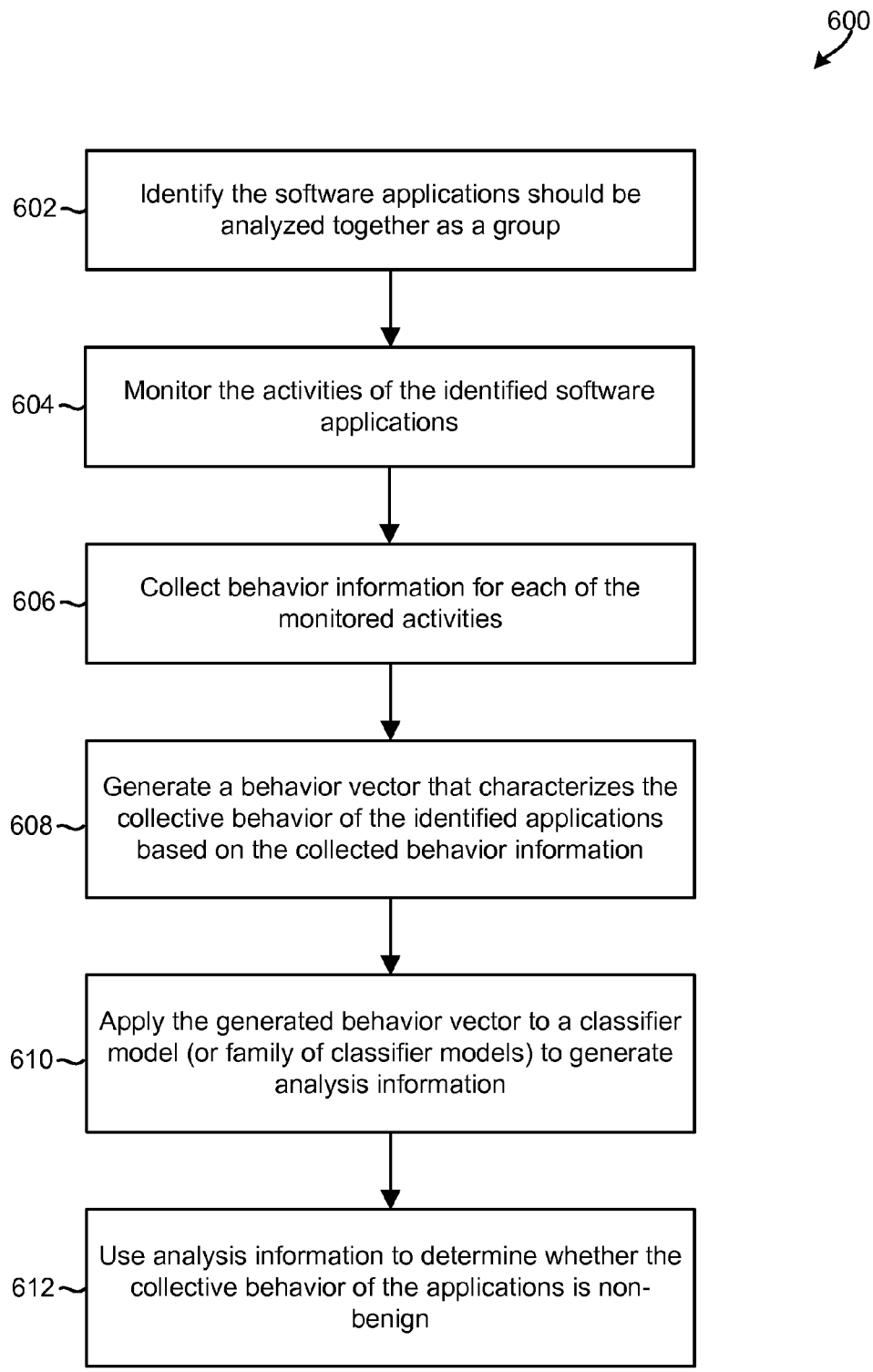
FIG. 6 is a process flow diagram illustrating a method of determining whether the collective behavior of two or more software applications is non-benign in accordance with another embodiment.

FIG. 6 illustrates a method 600 of using behavioral analysis techniques to determine whether the collective behavior of the identified applications is non-benign in accordance with another embodiment. Method 600 may be performed in a processing core of a mobile or resource constrained computing device. In block 602, the processing core may identify the software applications should be analyzed together as a group. In block 604, the processing core may monitor the activities of the identified applications. In block 606, the processing core may collect behavior information for each of the monitored activities. In block 608, the processing core may generate a behavior vector that characterizes the collective behavior of the identified applications based on the collected behavior information. In block 610, the processing core may apply the generated behavior vector to a classifier model (or family of classifier models) to generate analysis information. In block 612, the processing core may use the analysis information to determine whether the collective behavior of the identified applications is non-benign.

Figure 7:
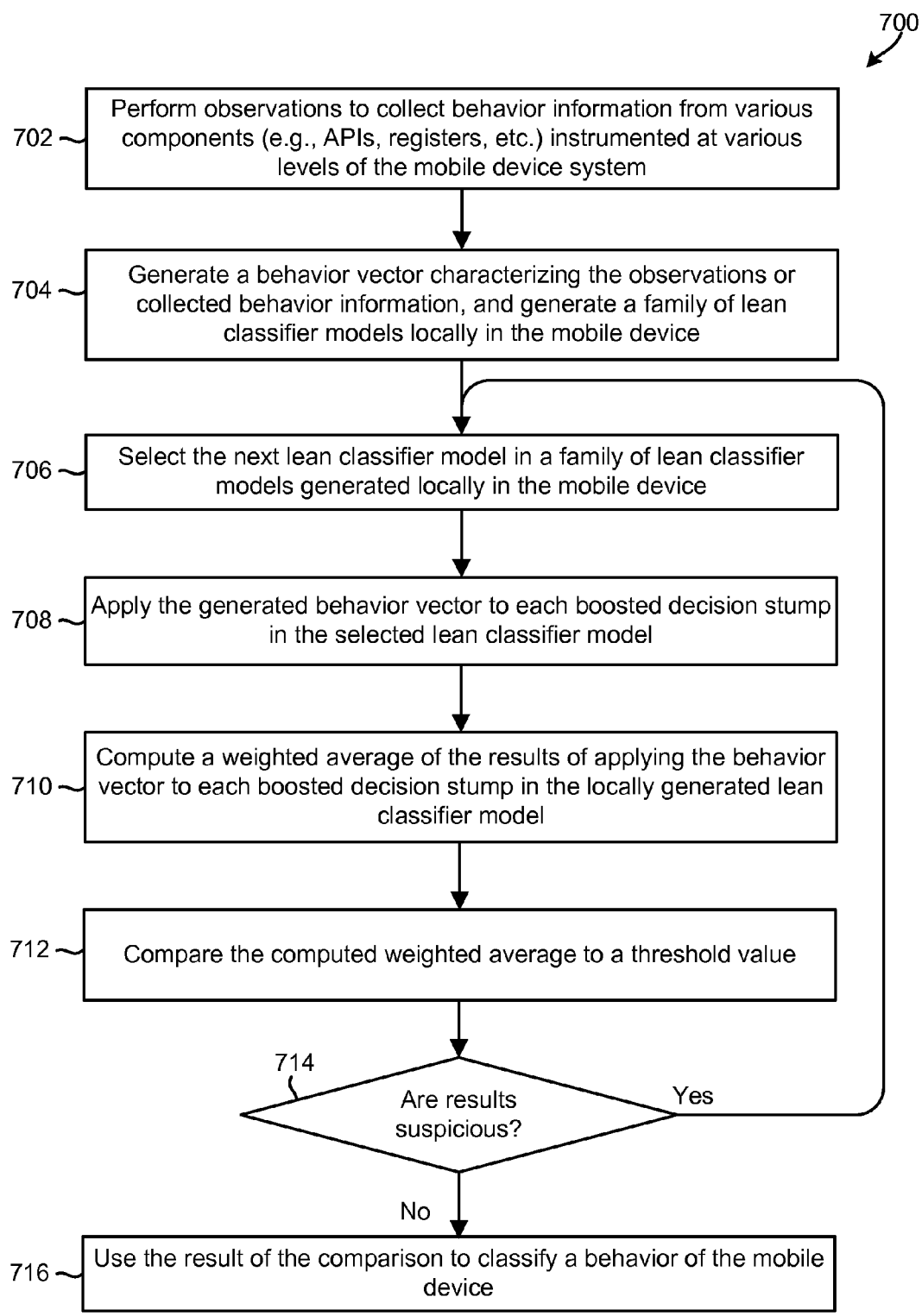
FIG. 7 is a process flow diagram illustrating another embodiment mobile device method of generating an application-based or lean classifier models in the mobile device.

FIG. 7 illustrates an embodiment method 700 of using a family of lean classifier model to classify a behavior of the computing device. Method 700 may be performed by a processing core of a mobile or resource constrained computing device.

In block 702, the processing core my perform observations to collect behavior information from various components that are instrumented at various levels of the computing device system. In an embodiment, this may be accomplished via the behavior observer module 202 discussed above with reference to FIG. 2. In block 704, the processing core may generate a behavior vector characterizing the observations, the collected behavior information, and/or a computing device behavior. Also in block 704, the processing core may use a full classifier model received from a network server to generate a lean classifier model or a family of lean classifier models of varying levels of complexity (or "leanness"). To accomplish this, the processing core may cull a family of boosted decision stumps included in the full classifier model to generate lean classifier models that include a reduced number of boosted decision stumps and/or evaluate a limited number of test conditions.

In block 706, the processing core may select the leanest classifier in the family of lean classifier models (i.e., the model based on the fewest number of different computing device states, features, behaviors, or conditions) that has not yet been evaluated or applied by the computing device. In an embodiment, this may be accomplished by the processing core selecting the first classifier model in an ordered list of classifier models.

In block 708, the processing core may apply collected behavior information or behavior vectors to each boosted decision stump in the selected lean classifier model. Because boosted decision stumps are binary decisions and the lean classifier model is generated by selecting many binary decisions that are based on the same test condition, the process of applying a behavior vector to the boosted decision stumps in the lean classifier model may be performed in a parallel operation. Alternatively, the behavior vector applied in block 530 may be truncated or filtered to just include the limited number of test condition parameters included in the lean classifier model, thereby further reducing the computational effort in applying the model.

In block 710, the processing core may compute or determine a weighted average of the results of applying the collected behavior information to each boosted decision stump in the lean classifier model. In block 712, the processing core may compare the computed weighted average to a threshold value. In determination block 714, the processing core may determine whether the results of this comparison and/or the results generated by applying the selected lean classifier model are suspicious. For example, the processing core may determine whether these results may be used to classify a behavior as either malicious or benign with a high degree of confidence, and if not treat the behavior as suspicious.

If the processing core determines that the results are suspicious (e.g., determination block 714="Yes"), the processing core may repeat the operations in blocks 706-712 to select and apply a stronger (i.e., less lean) classifier model that evaluates more device states, features, behaviors, or conditions until the behavior is classified as malicious or benign with a high degree of confidence. If the processing core determines that the results are not suspicious (e.g., determination block 714="No"), such as by determining that the behavior can be classified as either malicious or benign with a high degree of confidence, in block 716, the processing core may use the result of the comparison generated in block 712 to classify a behavior of the computing device as benign or potentially malicious.

In an alternative embodiment method, the operations described above may be accomplished by sequentially selecting a boosted decision stump that is not already in the lean classifier model; identifying all other boosted decision stumps that depend upon the same computing device state, feature, behavior, or condition as the selected decision stump (and thus can be applied based upon one determination result); including in the lean classifier model the selected and all identified other boosted decision stumps that that depend upon the same computing device state, feature, behavior, or condition; and repeating the process for a number of times equal to the determined number of test conditions. Because all boosted decision stumps that depend on the same test condition as the selected boosted decision stump are added to the lean classifier model each time, limiting the number of times this process is performed will limit the number of test conditions included in the lean classifier model.

Figure 8:
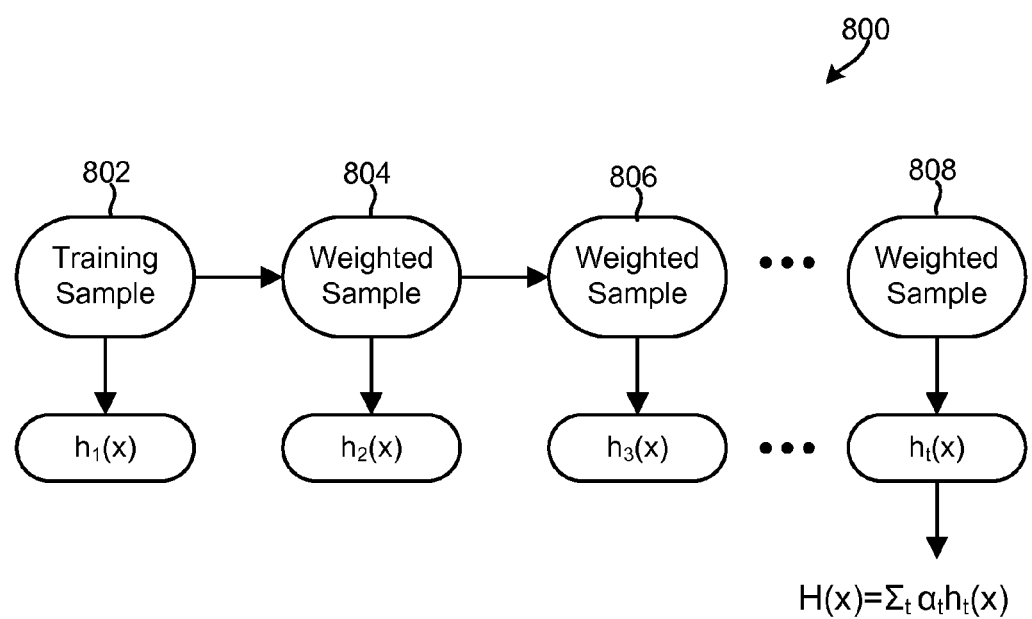
FIG. 8 is an illustration of example boosted decision stumps that may be generated by an embodiment server processor and used by a device processor to generate lean classifier models.

FIG. 8 illustrates an example boosting method 800 suitable for generating a boosted decision tree/classifier that is suitable for use in accordance with various embodiments. In block 802, a processor may generate and/or execute a decision tree/classifier, collect a training sample from the execution of the decision tree/classifier, and generate a new classifier model (h1($x$)) based on the training sample. The training sample may include information collected from previous observations or analysis of computing device behaviors, software applications, or processes in the computing device. The training sample and/or new classifier model (h1($x$)) may be generated based the types of question or test conditions included in previous classifiers and/or based on accuracy or performance characteristics collected from the execution/application of previous data/behavior models or classifiers in a classifier module of a behavior analyzer module 208. In block 804, the processor may boost (or increase) the weight of the entries that were misclassified by the generated decision tree/classifier (h1($x$)) to generate a second new tree/classifier (h2($x$)). In an embodiment, the training sample and/or new classifier model (h2($x$)) may be generated based on the mistake rate of a previous execution or use (h1($x$)) of a classifier. In an embodiment, the training sample and/or new classifier model (h2($x$)) may be generated based on attributes determined to have that contributed to the mistake rate or the misclassification of data points in the previous execution or use of a classifier.

In an embodiment, the misclassified entries may be weighted based on their relatively accuracy or effectiveness. In block 806, the processor may boost (or increase) the weight of the entries that were misclassified by the generated second tree/classifier (h2($x$)) to generate a third new tree/classifier (h3($x$)). In block 808, the operations of blocks 804-806 may be repeated to generate "t" number of new tree/classifiers (h$_t$($x$)).

By boosting or increasing the weight of the entries that were misclassified by the first decision tree/classifier (h1($x$)), the second tree/classifier (h2($x$)) may more accurately classify the entities that were misclassified by the first decision tree/classifier (h1($x$)), but may also misclassify some of the entities that where correctly classified by the first decision tree/classifier (h1($x$)). Similarly, the third tree/classifier (h3($x$)) may more accurately classify the entities that were misclassified by the second decision tree/classifier (h2($x$)) and may misclassify some of the entities that where correctly classified by the second decision tree/classifier (h2($x$)). That is, generating the family of tree/classifiers h1($x$)-h$_t$($x$) may not result in a system that converges as a whole, but results in a number of decision trees/classifiers that may be executed in parallel.

Figure 9:
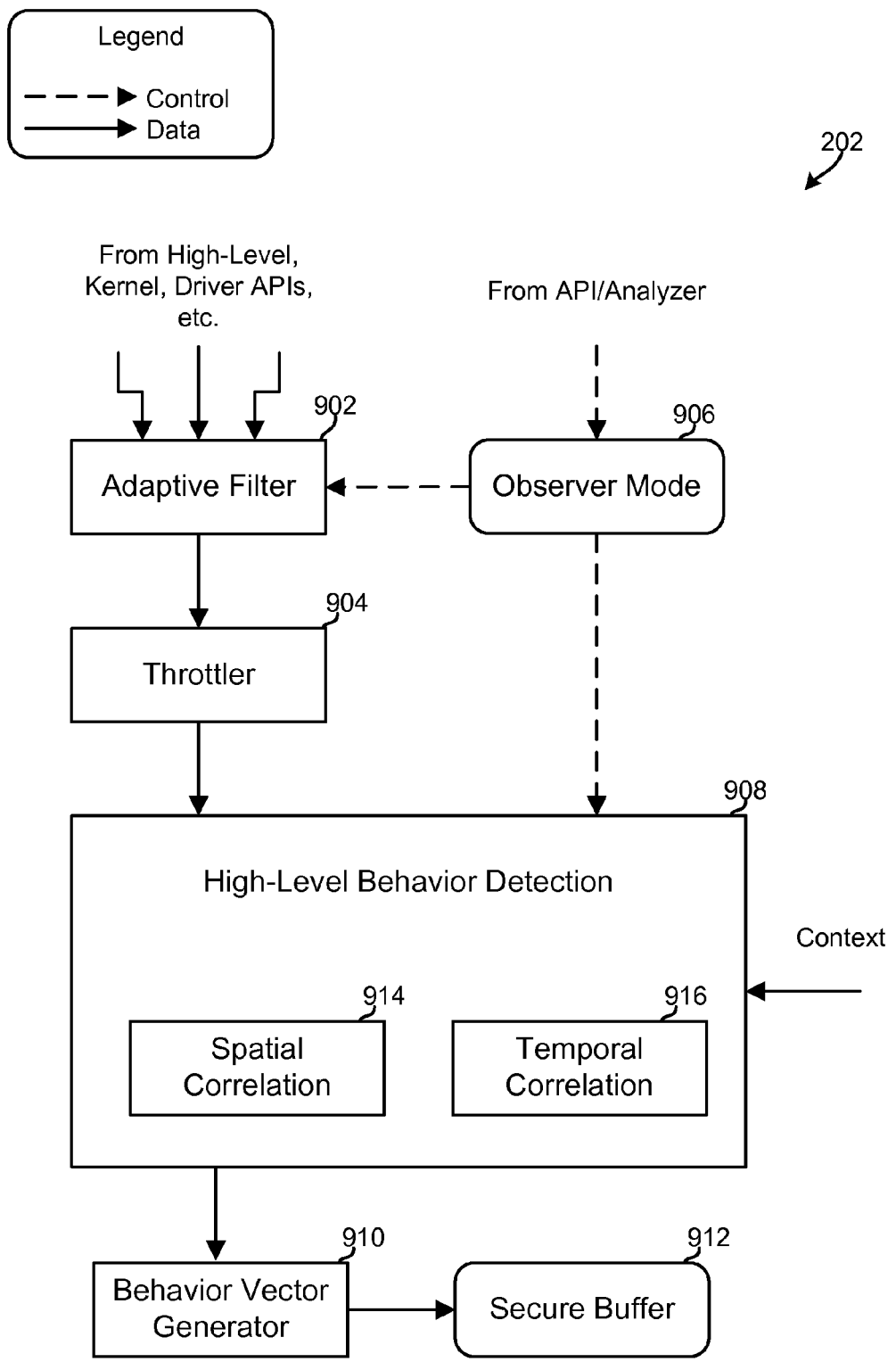
FIG. 9 is a block diagram illustrating example logical components and information flows in an observer module configured to perform dynamic and adaptive observations in accordance with an embodiment.

FIG. 9 illustrates example logical components and information flows in a behavior observer module 202 of a computing system configured to perform dynamic and adaptive observations in accordance with an embodiment. The behavior observer module 202 may include an adaptive filter module 902, a throttle module 904, an observer mode module 906, a high-level behavior detection module 908, a behavior vector generator 910, and a secure buffer 912. The high-level behavior detection module 908 may include a spatial correlation module 914 and a temporal correlation module 916.

The observer mode module 906 may receive control information from various sources, which may include an analyzer unit (e.g., the behavior analyzer module 208 described above with reference to FIG. 2) and/or an application API. The observer mode module 906 may send control information pertaining to various observer modes to the adaptive filter module 902 and the high-level behavior detection module 908.

The adaptive filter module 902 may receive data/information from multiple sources, and intelligently filter the received information to generate a smaller subset of information selected from the received information. This filter may be adapted based on information or control received from the analyzer module, or a higher-level process communicating through an API. The filtered information may be sent to the throttle module 904, which may be responsible for controlling the amount of information flowing from the filter to ensure that the high-level behavior detection module 908 does not become flooded or overloaded with requests or information.

The high-level behavior detection module 908 may receive data/information from the throttle module 904, control information from the observer mode module 906, and context information from other components of the computing device. The high-level behavior detection module 908 may use the received information to perform spatial and temporal correlations to detect or identify high level behaviors that may cause the device to perform at sub-optimal levels. The results of the spatial and temporal correlations may be sent to the behavior vector generator 910, which may receive the correlation information and generate a behavior vector that describes the behaviors of a particular process, application, or sub-system. In an embodiment, the behavior vector generator 910 may generate the behavior vector such that each high-level behavior of a particular process, application, or sub-system is an element of the behavior vector. In an embodiment, the generated behavior vector may be stored in a secure buffer 912. Examples of high-level behavior detection may include detection of the existence of a particular event, the amount or frequency of another event, the relationship between multiple events, the order in which events occur, time differences between the occurrence of certain events, etc.

In the various embodiments, the behavior observer module 202 may perform adaptive observations and control the observation granularity. That is, the behavior observer module 202 may dynamically identify the relevant behaviors that are to be observed, and dynamically determine the level of detail at which the identified behaviors are to be observed. In this manner, the behavior observer module 202 enables the system to monitor the behaviors of the computing device at various levels (e.g., multiple coarse and fine levels). The behavior observer module 202 may enable the system to adapt to what is being observed. The behavior observer module 202 may enable the system to dynamically change the factors/behaviors being observed based on a focused subset of information, which may be obtained from a wide verity of sources.

As discussed above, the behavior observer module 202 may perform adaptive observation techniques and control the observation granularity based on information received from a variety of sources. For example, the high-level behavior detection module 908 may receive information from the throttle module 904, the observer mode module 906, and context information received from other components (e.g., sensors) of the computing device. As an example, a high-level behavior detection module 908 performing temporal correlations might detect that a camera has been used and that the computing device is attempting to upload the picture to a server. The high-level behavior detection module 908 may also perform spatial correlations to determine whether an application on the computing device took the picture while the device was holstered and attached to the user's belt. The high-level behavior detection module 908 may determine whether this detected high-level behavior (e.g., usage of the camera while holstered) is a behavior that is acceptable or common, which may be achieved by comparing the current behavior with past behaviors of the computing device and/or accessing information collected from a plurality of devices (e.g., information received from a crowd-sourcing server). Since taking pictures and uploading them to a server while holstered is an unusual behavior (as may be determined from observed normal behaviors in the context of being holstered), in this situation the high-level behavior detection module 908 may recognize this as a potentially threatening behavior and initiate an appropriate response (e.g., shutting off the camera, sounding an alarm, etc.).

In an embodiment, the behavior observer module 202 may be implemented in multiple parts.

Figure 10:
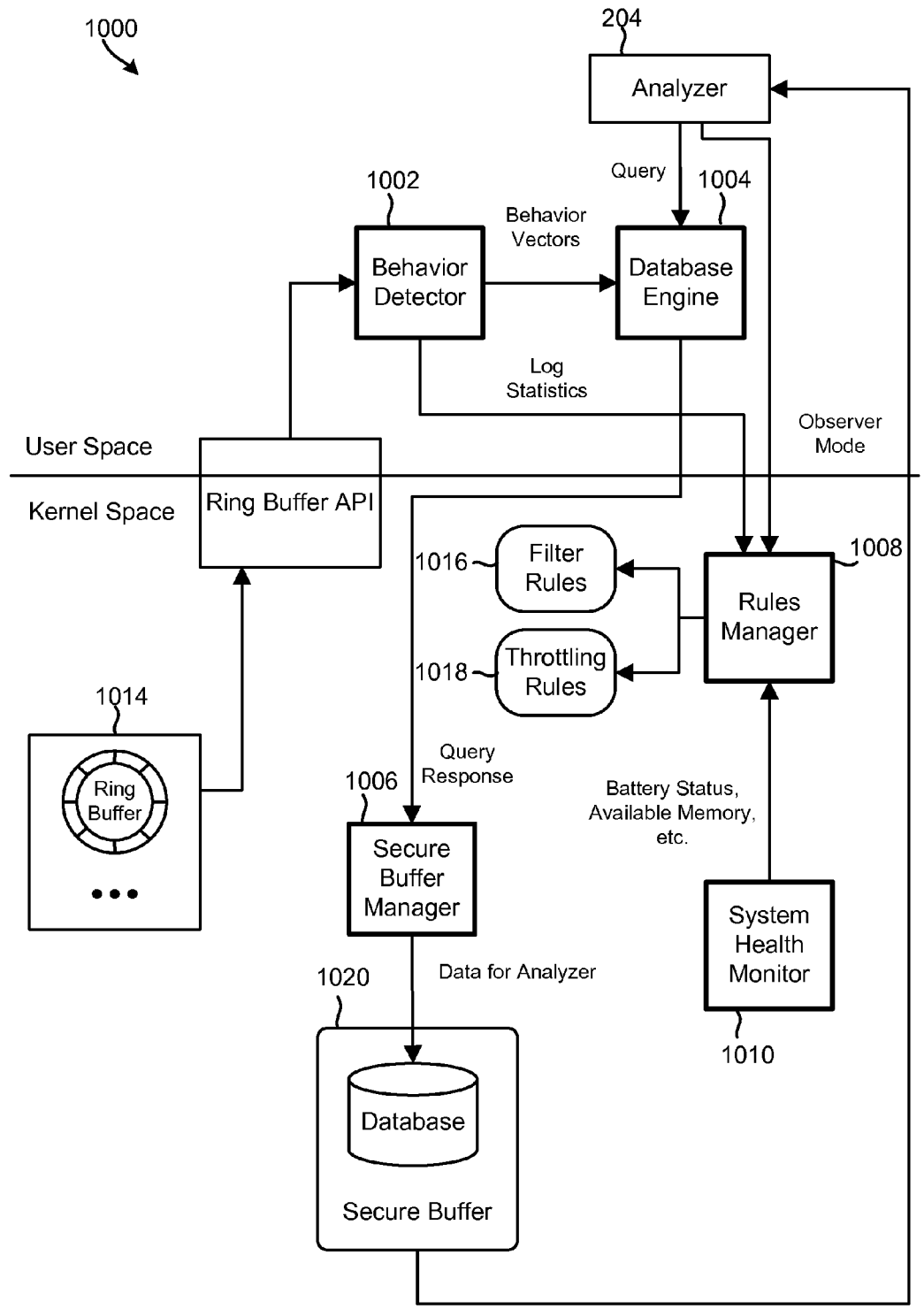
FIG. 10 is a block diagram illustrating logical components and information flows in a computing system implementing observer daemons in accordance with another embodiment.

FIG. 10 illustrates in more detail logical components and information flows in a computing system 1000 implementing an embodiment observer daemon. In the example illustrated in FIG. 10, the computing system 1000 includes a behavior detector 1002 module, a database engine 1004 module, and a behavior analyzer module 208 in the user space, and a ring buffer 1014, a filter rules 1016 module, a throttling rules 1018 module, and a secure buffer 1020 in the kernel space. The computing system 1000 may further include an observer daemon that includes the behavior detector 1002 and the database engine 1004 in the user space, and the secure buffer manager 1006, the rules manager 1008, and the system health monitor 1010 in the kernel space.

The various embodiments may provide cross-layer observations on computing devices encompassing webkit, SDK, NDK, kernel, drivers, and hardware in order to characterize system behavior. The behavior observations may be made in real time.

The observer module may perform adaptive observation techniques and control the observation granularity. As discussed above, there are a large number (i.e., thousands) of factors that could contribute to the computing device's degradation, and it may not be feasible to monitor/observe all of the different factors that may contribute to the degradation of the device's performance. To overcome this, the various embodiments dynamically identify the relevant behaviors that are to be observed, and dynamically determine the level of detail at which the identified behaviors are to be observed.

Figure 11:
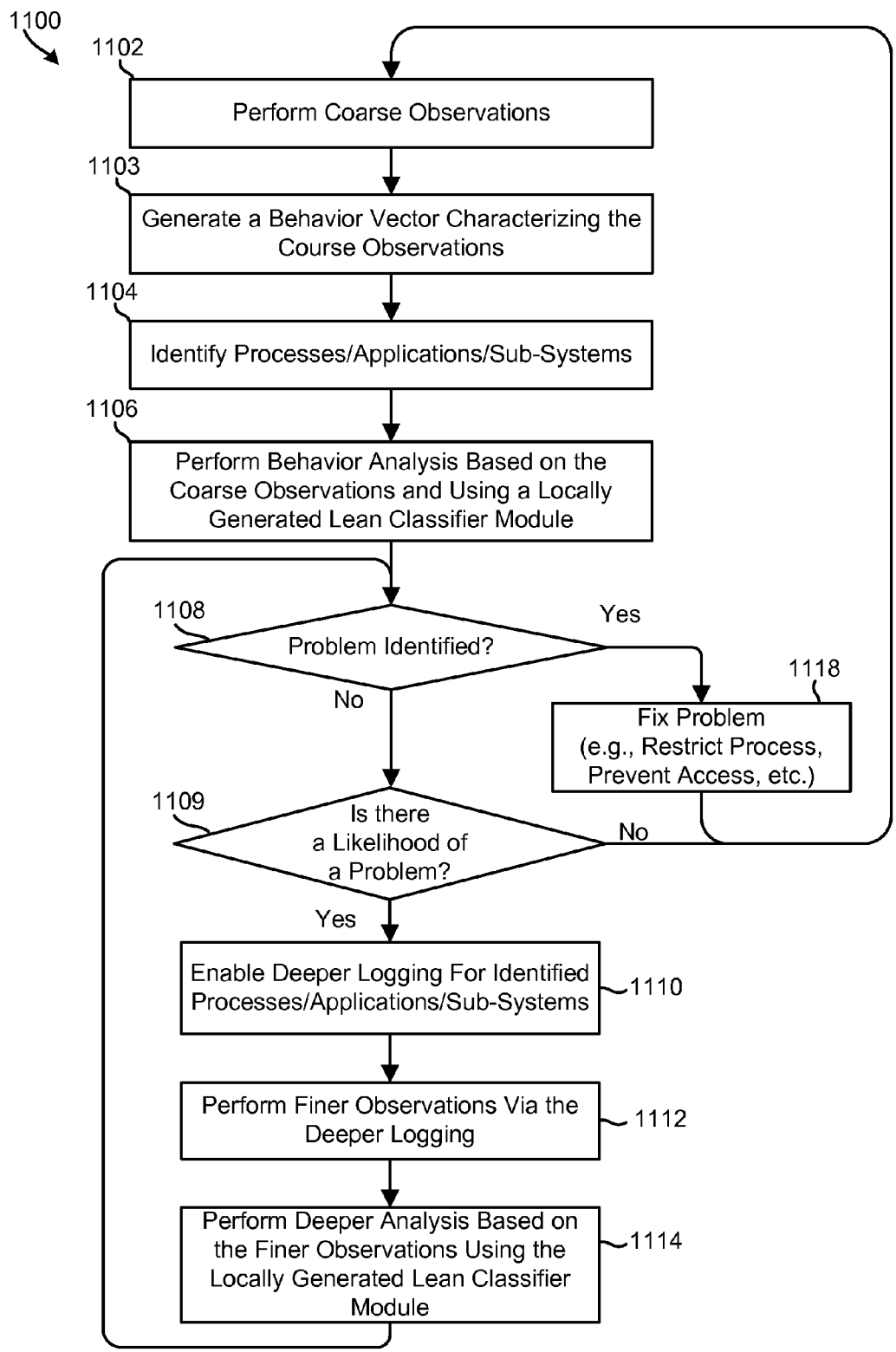
FIG. 11 is a process flow diagram illustrating an embodiment method for performing adaptive observations on mobile devices.

FIG. 11 illustrates an example method 1100 for performing dynamic and adaptive observations in accordance with an embodiment. In block 1102, the device processor may perform coarse observations by monitoring/observing a subset of a large number of factors/behaviors that could contribute to the computing device's degradation. In block 1103, the device processor may generate a behavior vector characterizing the coarse observations and/or the computing device behavior based on the coarse observations. In block 1104, the device processor may identify subsystems, processes, and/or applications associated with the coarse observations that may potentially contribute to the computing device's degradation. This may be achieved, for example, by comparing information received from multiple sources with contextual information received from sensors of the computing device. In block 1106, the device processor may perform behavioral analysis operations based on the coarse observations. In an embodiment, as part of blocks 1103 and 1104, the device processor may perform one or more of the operations discussed above with reference to FIGS. 2-10.

In determination block 1108, the device processor may determine whether suspicious behaviors or potential problems can be identified and corrected based on the results of the behavioral analysis. When the device processor determines that the suspicious behaviors or potential problems can be identified and corrected based on the results of the behavioral analysis (i.e., determination block 1108="Yes"), in block 1118, the processor may initiate a process to correct the behavior and return to block 1102 to perform additional coarse observations.

When the device processor determines that the suspicious behaviors or potential problems cannot be identified and/or corrected based on the results of the behavioral analysis (i.e., determination block 1108="No"), in determination block 1109 the device processor may determine whether there is a likelihood of a problem. In an embodiment, the device processor may determine that there is a likelihood of a problem by computing a probability of the computing device encountering potential problems and/or engaging in suspicious behaviors, and determining whether the computed probability is greater than a predetermined threshold. When the device processor determines that the computed probability is not greater than the predetermined threshold and/or there is not a likelihood that suspicious behaviors or potential problems exist and/or are detectable (i.e., determination block 1109="No"), the processor may return to block 1102 to perform additional coarse observations.

When the device processor determines that there is a likelihood that suspicious behaviors or potential problems exist and/or are detectable (i.e., determination block 1109="Yes"), in block 1110, the device processor may perform deeper logging/observations or final logging on the identified subsystems, processes or applications. In block 1112, the device processor may perform deeper and more detailed observations on the identified subsystems, processes or applications. In block 1114, the device processor may perform further and/or deeper behavioral analysis based on the deeper and more detailed observations. In determination block 1108, the device processor may again determine whether the suspicious behaviors or potential problems can be identified and corrected based on the results of the deeper behavioral analysis. When the device processor determines that the suspicious behaviors or potential problems cannot be identified and corrected based on the results of the deeper behavioral analysis (i.e., determination block 1108="No"), the processor may repeat the operations in blocks 1110-1114 until the level of detail is fine enough to identify the problem or until it is determined that the problem cannot be identified with additional detail or that no problem exists.

When the device processor determines that the suspicious behaviors or potential problems can be identified and corrected based on the results of the deeper behavioral analysis (i.e., determination block 1108="Yes"), in block 1118, the device processor may perform operations to correct the problem/behavior, and the processor may return to block 1102 to perform additional operations.

In an embodiment, as part of blocks 1102-1118 of method 1100, the device processor may perform real-time behavior analysis of the system's behaviors to identify suspicious behaviors from limited and coarse observations, to dynamically determine the behaviors to observe in greater detail, and to dynamically determine the precise level of detail required for the observations. This enables the device processor to efficiently identify and prevent problems from occurring, without requiring the use of a large amount of processor, memory, or battery resources on the device.

The various embodiments improve upon existing solutions by using behavior analysis and/or machine learning techniques (as opposed to a permissions, policy, or rules-based approaches) to monitor and analyze the collective behavior of a select group of software applications. The use of behavior analysis or machine learning techniques is important because modern computing devices are highly configurable and complex systems, and the factors that are most important for determining whether software applications are colluding may be different in each device. Further, different combinations of device features/factors may require an analysis in each device in order for that device to determine whether software applications are colluding. Yet, the precise combination of features/factors that require monitoring and analysis often can only be determined using information obtained from the specific computing device in which the activity is performed and at the time the activity is underway. For these and other reasons, existing solutions are not adequate for monitoring, detecting, and characterizing the collective behavior of, or the relationships between, a plurality of software applications in the computing device, in real-time, while the behavior is underway, and without consuming a significant amount of the computing device's processing, memory, or power resources.

Figure 12:
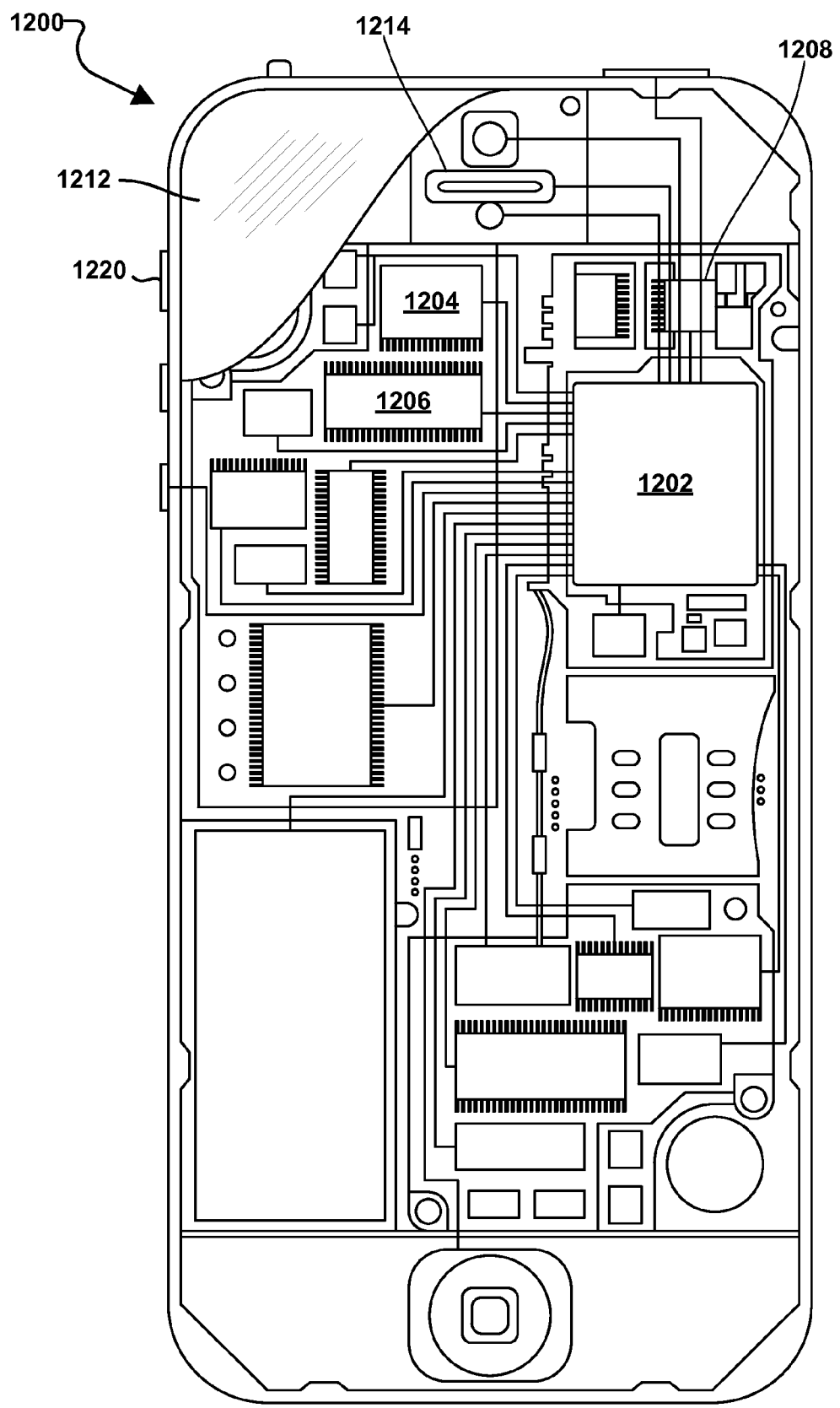
FIG. 12 is a component block diagram of a mobile device suitable for use in an embodiment.

The various embodiments (including, but not limited to, embodiments discussed above with reference to FIGS. 1-11) may be implemented on a variety of computing devices, an example of which is illustrated in FIG. 12 in the form of a smartphone. A smartphone 1200 may include a processor 1202 coupled to internal memory 1204, a display 1212, and to a speaker 1214. Additionally, the smartphone 1200 may include an antenna for sending and receiving electromagnetic radiation that may be connected to a wireless data link and/or cellular telephone transceiver 1208 coupled to the processor 1202. Smartphones 1200 typically also include menu selection buttons or rocker switches 1220 for receiving user inputs.

A typical smartphone 1200 also includes a sound encoding/decoding (CODEC) circuit 1206, which digitizes sound received from a microphone into data packets suitable for wireless transmission and decodes received sound data packets to generate analog signals that are provided to the speaker to generate sound. Also, one or more of the processor 1202, wireless transceiver 1208 and CODEC 1206 may include a digital signal processor (DSP) circuit (not shown separately). In an embodiment, the processor 1202 may be included in, a system-on-chip (SOC), such as the SOC 100 illustrated in FIG. 1. In an embodiment, the processor 1202 may be the application processor 108 illustrated in FIG. 1. In an embodiment, the processor 1202 may be a processing core (e.g., IP core, CPU core, etc.).

Figure 13:
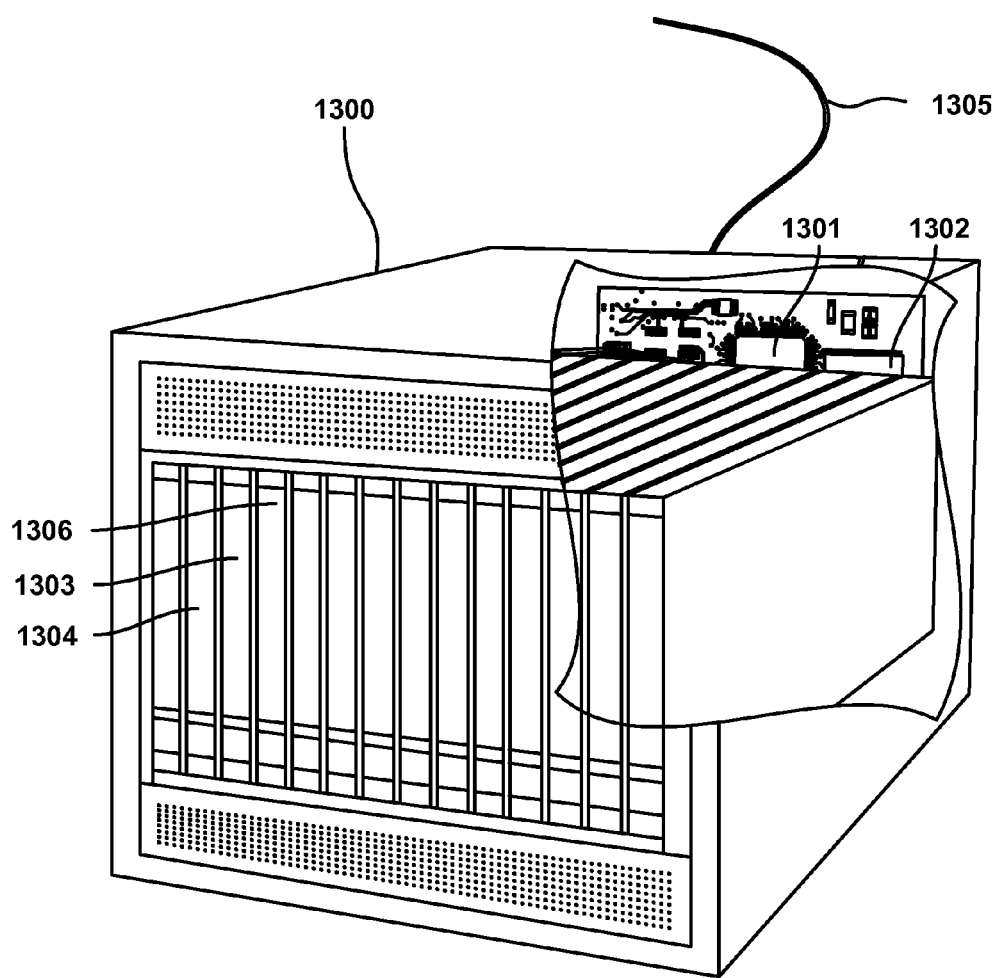
FIG. 13 is a component block diagram of a server device suitable for use in an embodiment.

Portions of the embodiment methods may be accomplished in a client-server architecture with some of the processing occurring in a server, such as maintaining databases of normal operational behaviors, which may be accessed by a device processor while executing the embodiment methods. Such embodiments may be implemented on any of a variety of commercially available server devices, such as the server 1300 illustrated in FIG. 13. Such a server 1300 typically includes a processor 1301 coupled to volatile memory 1302 and a large capacity nonvolatile memory, such as a disk drive 1303. The server 1300 may also include a floppy disc drive, compact disc (CD) or DVD disc drive 1304 coupled to the processor 1301. The server 1300 may also include network access ports 1306 coupled to the processor 1301 for establishing data connections with a network 1305, such as a local area network coupled to other broadcast system computers and servers.

The processors 1202, 1301 may be any programmable microprocessor, microcomputer or multiple processor chip or chips that can be configured by software instructions (applications) to perform a variety of functions, including the functions of the various embodiments described below. In some mobile devices, multiple processors 1202 may be provided, such as one processor dedicated to wireless communication functions and one processor dedicated to running other applications. Typically, software applications may be stored in the internal memory 1204, 1302, 1303 before they are accessed and loaded into the processor 1202, 1301. The processor 1202, 1301 may include internal memory sufficient to store the application software instructions.

As used in this application, the terms "component," "module," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution, and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many mobile computing devices operating system kernels are organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The foregoing method descriptions and the process flow diagrams are provided merely as illustrative examples, and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more processor-executable instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of analyzing a behavior of a computing device, comprising:
   monitoring, in a processor of the computing device, activities and interactions between a plurality of software applications on the computing device to collect behavior information;
   aggregating behavior information collected from multiple individual software applications;
   generating a behavior vector information structure that includes a plurality of numerical values that characterize a collective behavior of two or more of the plurality of software applications based on the aggregated behavior information;
   applying the generated behavior vector information structure to a multi-application classifier model to evaluate each test condition included in the multi-application classifier model and generate analysis information, wherein each test condition in the multi-application classifier model tests a condition relevant to evaluating a relationship between two or more of the plurality of software applications;
   using the generated analysis information to:
      categorize the monitored plurality of software applications;
      generating performance numbers for each category of the plurality of software applications;
      determine whether two or more of the plurality of software applications are working in concert;

evaluate the collective behavior of two or more of the plurality of software applications; and
generate evaluation results; and
determining whether the collective behavior is non-benign based on the generated evaluation results.

2. The method of claim 1, wherein generating the behavior vector information structure that includes the plurality of numerical values that characterize the collective behavior of two or more of the plurality of software applications based on the aggregated behavior information comprises generating an information structure that characterizes the collective behavior of all of the software applications in the plurality of software applications via the plurality of numerical values.

3. The method of claim 1, wherein generating the behavior vector information structure that includes the plurality of numerical values that characterize the collective behavior of two or more of the plurality of software applications based on the aggregated behavior information comprises generating an information structure that characterizes the relationship between two or more of the plurality of software applications via the plurality of numerical values.

4. The method of claim 1, wherein using the generated analysis information further comprises identifying two or more software applications that should be evaluated together as a group.

5. The method of claim 4, further comprising:
monitoring additional activities of the identified two or more software applications to collect additional behavior information;
generating a collective behavior vector that characterizes the collective behavior of the identified two or more software applications based on the collected additional behavior information;
applying the generated collective behavior vector to the multi-application classifier model to generate additional analysis information; and
using the additional analysis information to determine whether the collective behavior of the identified two or more software applications is non-benign.

6. The method of claim 4, further comprising:
applying behavior vectors that each characterizes the behavior of the identified two or more software applications to the multi-application classifier model to generate additional analysis information;
aggregating the additional analysis information generated for each of the behavior vectors; and
using the aggregated analysis information to determine whether the collective behavior of the identified two or more software applications is non-benign.

7. The method of claim 1, further comprising:
computing a weighted average of each result of evaluating test conditions in the multi-application classifier model;
wherein determining whether the collective behavior is non-benign based on the generated evaluation results comprises determining whether the collective behavior is non-benign based on the weighted average.

8. The method of claim 1, wherein using the generated analysis information further comprises profiling each category of the plurality of software applications.

9. A computing device, comprising:
a processor configured to:
monitor activities and interactions between a plurality of software applications on the computing device to collect behavior information;
aggregate behavior information collected from multiple individual software applications;
generate a behavior vector information structure that includes a plurality of numerical values that characterize a collective behavior of two or more of the plurality of software applications based on the aggregated behavior information;
apply the generated behavior vector information structure to a multi-application classifier model to evaluate each test condition included in the multi-application classifier model and generate analysis information, wherein each test condition in the multi-application classifier model tests a condition relevant to evaluating a relationship between two or more of the plurality of software applications;
use the generated analysis information to:
categorize the monitored plurality of software applications;
generating performance numbers for each category of the plurality of software applications;
determine whether two or more of the plurality of software applications are working in concert;
evaluate the collective behavior of two or more of the plurality of software applications; and
generate evaluation results; and
determine whether the collective behavior is non-benign based on the generated evaluation results.

10. The computing device of claim 9, wherein the processor is further configured with processor-executable instructions to generate the behavior vector information structure that includes the plurality of numerical values that characterize the collective behavior of two or more of the plurality of software applications based on the collected aggregated behavior information by generating an information structure that characterizes the collective behavior of all of the software applications in the plurality of software applications via the plurality of numerical values.

11. The computing device of claim 9, wherein the processor is further configured with processor-executable instructions to generate the behavior vector information structure that includes the plurality of numerical values that characterize the collective behavior of two or more of the plurality of software applications based on the aggregated behavior information by generating an information structure that characterizes a relationship between two or more of the plurality of software applications via the plurality of numerical values.

12. The computing device of claim 9, wherein the processor is further configured with processor-executable instructions such that using the generated analysis information further comprises identifying two or more software applications that should be evaluated together as a group.

13. The computing device of claim 12, wherein the processor is further configured with processor-executable instructions to:
monitor additional activities of the identified two or more software applications to collect additional behavior information;
generate a collective behavior vector that characterizes the collective behavior of the identified two or more software applications based on the collected additional behavior information;
apply the generated collective behavior vector to the multi-application classifier model to generate additional analysis information; and
use the additional analysis information to determine whether the collective behavior of the identified two or more software applications is non-benign.

14. The computing device of claim 12, wherein the processor is further configured with processor-executable instructions to:
- apply behavior vectors that each characterizes a behavior of the identified two or more software applications to the multi-application classifier model to generate additional analysis information;
- aggregate the additional analysis information generated for each of the behavior vectors; and
- use the aggregated analysis information to determine whether the collective behavior of the identified two or more software applications is non-benign.

15. The computing device of claim 9, wherein:
- the processor is further configured with processor-executable instructions to compute a weighted average of each result of evaluating test conditions in the multi-application classifier model; and
- the processor is configured with processor-executable instructions to determine whether the collective behavior is non-benign based on the generated evaluation results by determining whether the collective behavior is non-benign based on the weighted average.

16. The computing device of claim 9, wherein the processor is configured with processor-executable instructions such that using the analysis information further comprises profiling each category of the plurality of software applications.

17. The computing device of claim 9, further comprising a behavior observer hardware module configured to monitor use of computing device memory and hardware events at a hardware level and output collected behavior information to the processor, wherein the processor is configured with processor-executable instructions to monitor the activities of the plurality of software applications by receiving the collected behavior information from the behavior observer hardware module.

18. A non-transitory computer readable storage medium having stored thereon processor-executable software instructions configured to cause a processor in a computing device to perform operations comprising:
- monitoring activities and interactions between a plurality of software applications on the computing device to collect behavior information;
- aggregating behavior information collected from multiple individual software applications;
- generating a behavior vector information structure that includes a plurality of numerical values that characterize a collective behavior of two or more of the plurality of software applications based on the aggregated behavior information;
- applying the generated behavior vector information structure to a multi-application classifier model to evaluate each test condition included in the multi-application classifier model and generate analysis information, wherein each test condition in the multi-application classifier model tests a condition relevant to evaluating a relationship between two or more of the plurality of software applications;
- using the generated analysis information to:
  - categorize the monitored plurality of software applications;
  - generating performance numbers for each category of the plurality of software applications;
  - determine whether two or more of the plurality of software applications are working in concert;
  - evaluate the collective behavior of two or more of the plurality of software applications; and
  - generate evaluation results; and
- determining whether the collective behavior is non-benign based on the generated evaluation results.

19. The non-transitory computer readable storage medium of claim 18, wherein the stored processor-executable software instructions are configured to cause a processor to perform operations such that generating the behavior vector information structure that includes the plurality of numerical values that characterize the collective behavior of two or more of the plurality of software applications based on the aggregated behavior information comprises generating an information structure that characterizes the collective behavior of all of the software applications in the plurality of software applications via the plurality of numerical values.

20. The non-transitory computer readable storage medium of claim 18, wherein the stored processor-executable software instructions are configured to cause a processor to perform operations such that generating the behavior vector information structure that includes the plurality of numerical values that characterize the collective behavior of two or more of the plurality of software applications based on the aggregated behavior information comprises generating an information structure that characterizes a relationship between two or more of the plurality of software applications via the plurality of numerical values.

21. The non-transitory computer readable storage medium of claim 18, wherein the stored processor-executable software instructions are configured to cause a processor to perform operations such that using the generated analysis information further comprises identifying two or more software applications that should be evaluated together as a group.

22. A computing device, comprising:
- means for monitoring activities and interactions between a plurality of software applications on the computing device to collect behavior information;
- means for aggregating behavior information collected from multiple individual software applications;
- means for generating a behavior vector information structure that includes a plurality of numerical values that characterize a collective behavior of two or more of the plurality of software applications based on the aggregated behavior information;
- means for applying the generated behavior vector information structure to a multi-application classifier model to evaluate each test condition included in the multi-application classifier model and generate analysis information, wherein each test condition in the multi-application classifier tests a condition relevant to evaluating a relationship between of two or more of the plurality of software applications;
- means for using the generated analysis information to:
  - categorize the monitored plurality of software applications;
  - generating performance numbers for each category of the plurality of software applications;
  - determine whether two or more of the plurality of software applications are working in concert;
  - evaluate the collective behavior of two or more of the plurality of software applications; and
  - generate evaluation results; and
- means for determining whether the collective behavior is non-benign based on the generated evaluation results.

23. The computing device of claim 22, wherein means for generating the behavior vector information structure that includes the plurality of numerical values that characterize the collective behavior of two or more of the plurality of software applications based on the aggregated behavior information comprises means for generating an information structure that characterizes the collective behavior of all of the software applications in the plurality of software applications via the plurality of numerical values.

24. The computing device of claim 22, wherein means for generating the behavior vector information structure that includes the plurality of numerical values that characterize the collective behavior of two or more of the plurality of software applications based on the aggregated behavior information comprises means for generating an information structure that characterizes a relationship between two or more of the plurality of software applications via the plurality of numerical values.

25. The computing device of claim 22, wherein
means for using the generated analysis information further comprises means for identifying two or more software applications that should be evaluated together as a group.

26. The computing device of claim 25, further comprising:
means for monitoring additional activities of the identified two or more software applications to collect additional behavior information;
means for generating a collective behavior vector that characterizes the collective behavior of the identified two or more software applications based on the collected additional behavior information;
means for applying the generated collective behavior vector to the multi-application classifier model to generate additional analysis information; and
means for using the additional analysis information to determine whether the collective behavior of the identified two or more software applications is non-benign.

* * * * *